US012775250B2

(12) United States Patent
Fujita et al.

(10) Patent No.: US 12,775,250 B2
(45) Date of Patent: Oct. 27, 2026

(54) INFORMATION PROCESSING APPARATUS, CONTROL METHOD, PROGRAM, AND PRESENTATION APPARATUS

(71) Applicant: Sony Group Corporation, Tokyo (JP)

(72) Inventors: Masahiro Fujita, Tokyo (JP); Youichi Endo, Tokyo (JP); Francois Chartier, Montreal (CA)

(73) Assignee: Sony Group Corporation, Tokyo (JP)

( * ) Notice: Subject to any disclaimer, the term of this patent is extended or adjusted under 35 U.S.C. 154(b) by 317 days.

(21) Appl. No.: 18/576,762

(22) PCT Filed: Feb. 24, 2022

(86) PCT No.: PCT/JP2022/007467
§ 371 (c)(1),
(2) Date: Jan. 5, 2024

(87) PCT Pub. No.: WO2023/286318
PCT Pub. Date: Jan. 19, 2023

(65) Prior Publication Data

US 2024/0310798 A1 Sep. 19, 2024

(30) Foreign Application Priority Data

Jul. 12, 2021 (JP) ................................ 2021-115099

(51) Int. Cl.
*G05B 13/02* (2006.01)

(52) U.S. Cl.
CPC .................................. *G05B 13/028* (2013.01)

(58) Field of Classification Search
CPC ....... G05B 13/028; G06Q 50/10; G06Q 50/12
See application file for complete search history.

(56) References Cited

U.S. PATENT DOCUMENTS 6,294,186 B1 * 9/2001 Beerse ............... A01N 2300/00 514/156
2001/0056349 A1 * 12/2001 St. John .................. G07C 9/37 704/270

(Continued)

FOREIGN PATENT DOCUMENTS

GB 2589671 A 6/2021
JP 2003-250509 A 9/2003

(Continued)

OTHER PUBLICATIONS

International Search Report and Written Opinion mailed on May 31, 2022, received for PCT Application PCT/JP2022/007467, filed on Feb. 24, 2022, 8 pages including English Translation.

(Continued)

*Primary Examiner* — Ziaul Karim
(74) *Attorney, Agent, or Firm* — XSENSUS LLP

(57) ABSTRACT

The present technology relates to an information processing apparatus, a control method, a program, and a presentation apparatus that enable to suitably present an aroma of a dish. An information processing apparatus according to one aspect of the present technology controls a presentation apparatus including a first delivery unit that delivers an aroma of a dish toward a nose and a second delivery unit that delivers the aroma of the dish toward a throat, and presents the aroma of the dish to a user, using the aroma through the nose and the aroma through the throat. The present technology can be applied to a computer that controls a device that creates an aroma of a dish.

14 Claims, 27 Drawing Sheets

(56) References Cited

U.S. PATENT DOCUMENTS

| | | | | |
|---|---|---|---|---|
| 2002/0002460 | A1* | 1/2002 | Pertrushin | H04M 3/533 704/E17.002 |
| 2002/0002464 | A1* | 1/2002 | Petrushin | G10L 17/26 704/275 |
| 2017/0011145 | A1* | 1/2017 | Adoni | G16H 20/60 |
| 2017/0361133 | A1* | 12/2017 | Yu | A62B 18/003 |

FOREIGN PATENT DOCUMENTS

| | | | |
|---|---|---|---|
| JP | 2004-133870 | A | 4/2004 |
| JP | 2018-086230 | A | 6/2018 |
| JP | 2020-134145 | A | 8/2020 |
| WO | 2019/053989 | A1 | 3/2019 |
| WO | WO-2021040616 | A1 | 3/2021 |

OTHER PUBLICATIONS

Homei Miyashita, "Norimaki Synthesizer: Taste Display Using Ion Electrophoresis in Five Gels". Available Online at: https://research.miyashita.com/papers/I42, Apr. 25-30, 2020, 6 pages.

* cited by examiner

FIG. 3

FLAVOR (flavor) = TASTE (taste) + AROMA (aroma)

FIG. 17

| FOOD CATEGORY | SUB-CATEGORY | COOKING METHOD | AROMATIC INGREDIENT | RECIPES |
|---|---|---|---|---|
| SEA FOOD | Crustacean<br>Shellfish | Raw<br>Boiled<br>Grilled<br>Steamed<br>Roasted<br>Fried<br>Marinated<br>Fermented<br>Aged<br>Dried<br>Smoked<br>Infused<br>Frozen<br>Vacuum cooking<br>… | <HERBS><br>Coriander<br>Mint<br>Persil<br>Thym<br>Rosemary<br>… etc.<br><SPICES><br>Curry<br>Vainilla<br>Pepper<br>… etc.<br><OTHERS><br>Olive oil<br>Butter<br>Soya Sauce<br>Garlic<br>Fish sauce<br>… etc. | Garlic butter Lobster<br>Mussels a la meuniere<br>… etc. |
| MEAT | Red<br>White | | | Smoked Bacon<br>Grilled beef green & pepper corn sauce<br>…etc. |
| VEGETABLE | Greens<br>Roots<br>Tomatoes<br>… | | | Roasted vegetables with sesame<br>… etc. |
| FISH | | | | Ceviche with coriander<br>Fish and chips<br>… etc. |
| CHOCOLATE | Black<br>White<br>Ruby | | | Smoked chocolate cake<br>… etc. |
| FRUIT | Berries<br>White flesh<br>Yellow flesh<br>Exotic<br>… | | | Roasted pineaple<br>Raw fruit salad with mint<br>Strawberry Chantilly cake<br>… etc. |

INFORMATION PROCESSING APPARATUS, CONTROL METHOD, PROGRAM, AND PRESENTATION APPARATUS

CROSS-REFERENCE TO RELATED APPLICATIONS

The present application is based on PCT filing PCT/JP2022/007467, filed Feb. 24, 2022, which claims priority from Japanese Patent Application No. 2021-115099, filed Jul. 12, 2021, the contents of each are hereby incorporated by reference.

TECHNICAL FIELD

The present technology relates to an information processing apparatus, a control method, a program, and a presentation apparatus and particularly relates to an information processing apparatus, a control method, a program, and a presentation apparatus enabled to suitably present an aroma of a dish.

BACKGROUND ART

In order to sense the flavor of ingredients and dishes, it is usually necessary to prepare and actually eat ingredients and the like.

Meanwhile, a technology for presenting a taste has been proposed (for example, Non-Patent Document 1). Using such a technology enables to check the taste without actually preparing and eating ingredients or the like.

Here, the flavor is affected by the aroma sensed by the sense of smell, as well as by the taste sensed by the sense of taste. In the way a person senses a flavor, the aroma is important together with the taste. There is also an idea that a person senses most of the flavor with the aroma. As a technology for presenting an aroma, there is a technology using a stick-like device as disclosed in Patent Document 1.

CITATION LIST

Patent Document

Patent Document 1: WO 2019/053989

Non-Patent Document

Non-Patent Document 1: "Norimaki Synthesizer: Taste Display Using Ion Electrophoresis in Five Gels", [online], Apr. 29, 2020, [searched on May 13, 2021], Internet <URL: https://research.miyashita.com/papers/I42>

SUMMARY OF THE INVENTION

Problems to be Solved by the Invention

The aroma sensed by a person includes aromas in two routes: an aroma in the Orthonasal route and an aroma in the Retronasal route.

The aroma in the Orthonasal route is an aroma sensed by sucking a gas including an aroma component through the nose.

The aroma in the Retronasal route is an aroma sensed through a path called back throat that leads to the nasal cavity from the throat. When an ingredient or a dish is put into the mouth, the aroma in the Retronasal route can be sensed as a so-called aroma that escapes into the nose.

The present technology has been made in view of such a situation and is intended to enable to suitably present an aroma of a dish.

Solutions to Problems

An information processing apparatus according to one aspect of the present technology includes a presentation control unit that controls a presentation apparatus including a first delivery unit that delivers an aroma of a dish toward a nose and a second delivery unit that delivers the aroma of the dish toward a throat, and presents the aroma of the dish to a user, using the aroma through the nose and the aroma through the throat.

A presentation apparatus according to another aspect of the present technology includes: an aroma creation unit that creates an aroma of a dish; a first delivery unit that delivers the aroma of the dish toward a nose; and a second delivery unit that delivers the aroma of the dish toward a throat.

In the present technology, an aroma of a dish is presented to a user, using an aroma through the nose and an aroma through the throat.

BRIEF DESCRIPTION OF DRAWINGS

FIG. 3 is a diagram illustrating an example of constituent elements of the flavor.

FIG. 17 is a diagram illustrating an example of dish information.

MODE FOR CARRYING OUT THE INVENTION

Overview of Present Technology

The present technology is intended to present a taste and an aroma of a dish to a user without actually eating that dish. A flavor presentation device is used to present a taste and an aroma.

For example, a chef as a user is allowed to consider a combination of ingredients or cooking methods with reference to the presented flavor. The present technology is used by a chef as a tool that supports consideration of a recipe of a new dish, for example.

A case where a chef is treated as a user and receives presentation of a flavor will be mainly described, but various people who experience the flavor of a dish can be treated as users. For example, the present technology is also applicable to a case where a user who is listening and viewing content such as a movie experiences a flavor of a dish appearing in the movie. In addition, the present technology is also applicable to a case where, for example, a user who enters a restaurant and considers which dish to order experiences a flavor of a dish listed in the menu.

The user who selects the ingredients, the cooking methods, and the like and the user who experiences the flavor may be the same person or different persons.

Note that the dish means a product completed after cooking. The cooking means a course of making a dish or an action (work) of making a dish.

Hereinafter, modes for carrying out the present technology will be described. The description will be given in the following order.

1. Presentation of Flavor to Chef
2. Configuration and Working of Each Apparatus
3. Learning of Inference Model
4. Modifications <<Presentation of Flavor to Chef>>

Figure 1:
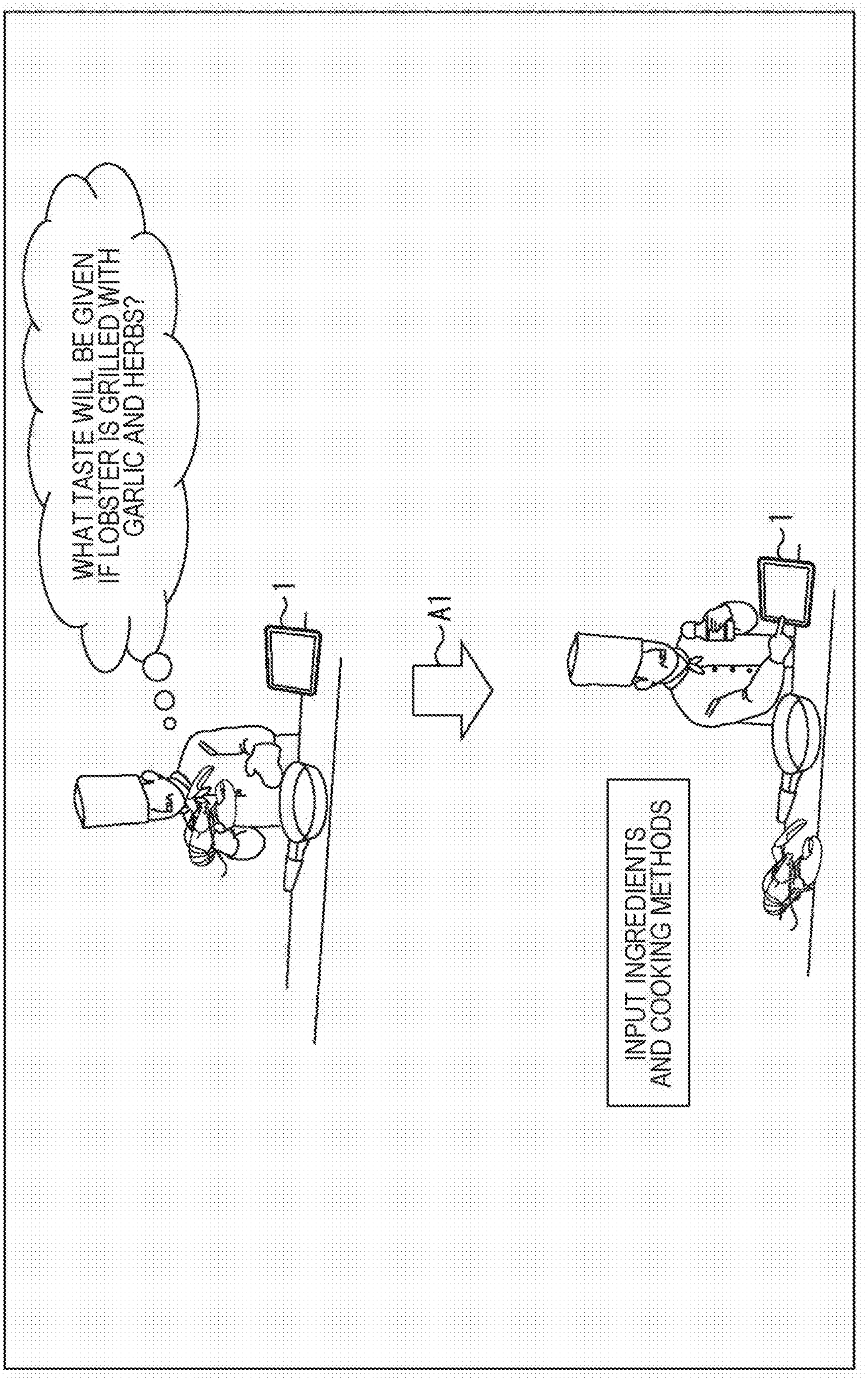
FIG. 1 is a diagram illustrating an example of a use of a flavor presentation system according to an embodiment of the present technology.

FIG. 1 is a diagram illustrating an example of a use of a flavor presentation system according to an embodiment of the present technology.

In the example in FIG. 1, an information processing apparatus 1 that is a tablet terminal having a small display is placed near a chef who is a user. A computer having a housing of another form, such as a personal computer (PC), a smartphone, or a flat type television (TV) having a large display, may be used as the information processing apparatus 1.

The information processing apparatus 1 is an apparatus used, for example, when a chef being in a kitchen is considering a recipe by trying a variety of ingredients or trying a variety of cooking methods in order to make a new dish.

The situation illustrated in the upper part of FIG. 1 is a situation in which a chef is considering what flavor will be given if lobster is chosen as an ingredient to be used for cooking from among a variety of ingredients, and the lobster is grilled with garlic and herbs put thereon. After having conceived the ingredients and the cooking methods, the chef inputs the ingredients and the cooking methods using a graphical user interface (GUI) of the information processing apparatus 1 as indicated ahead of the arrow A1.

In this example, "lobster", "garlic", and "herbs" are input as the ingredients. For example, the ingredients are divided into a staple ingredient and an aromatic ingredient and input. The aromatic ingredients are ingredients mainly used for flavoring of dishes, such as spices, garlic, and butter. The type and amount of each of the staple ingredient and the aromatic ingredients are input.

One ingredient may be selected as each of the staple ingredient and the aromatic ingredient, or a plurality of types of ingredients may be selected. In a case where it is not necessary to distinguish between the staple ingredient and the aromatic ingredient, the staple ingredient and the aromatic ingredient will be collectively referred to as ingredients as appropriate.

In addition, as a cooking method, the way of preliminaries before grilling and "grilling" are input. The preliminaries before grilling include the way of slicing ingredients, the way of boiling, and the like. Various sorts of information regarding the cooking method, such as a tool used for cooking, the order of cooking stages, and the time of each cooking stage, are input.

Various displays used to select the ingredient and the cooking method are provided on the screen of the information processing apparatus 1. The ingredient and the cooking method may be selected using voice.

Figure 2:
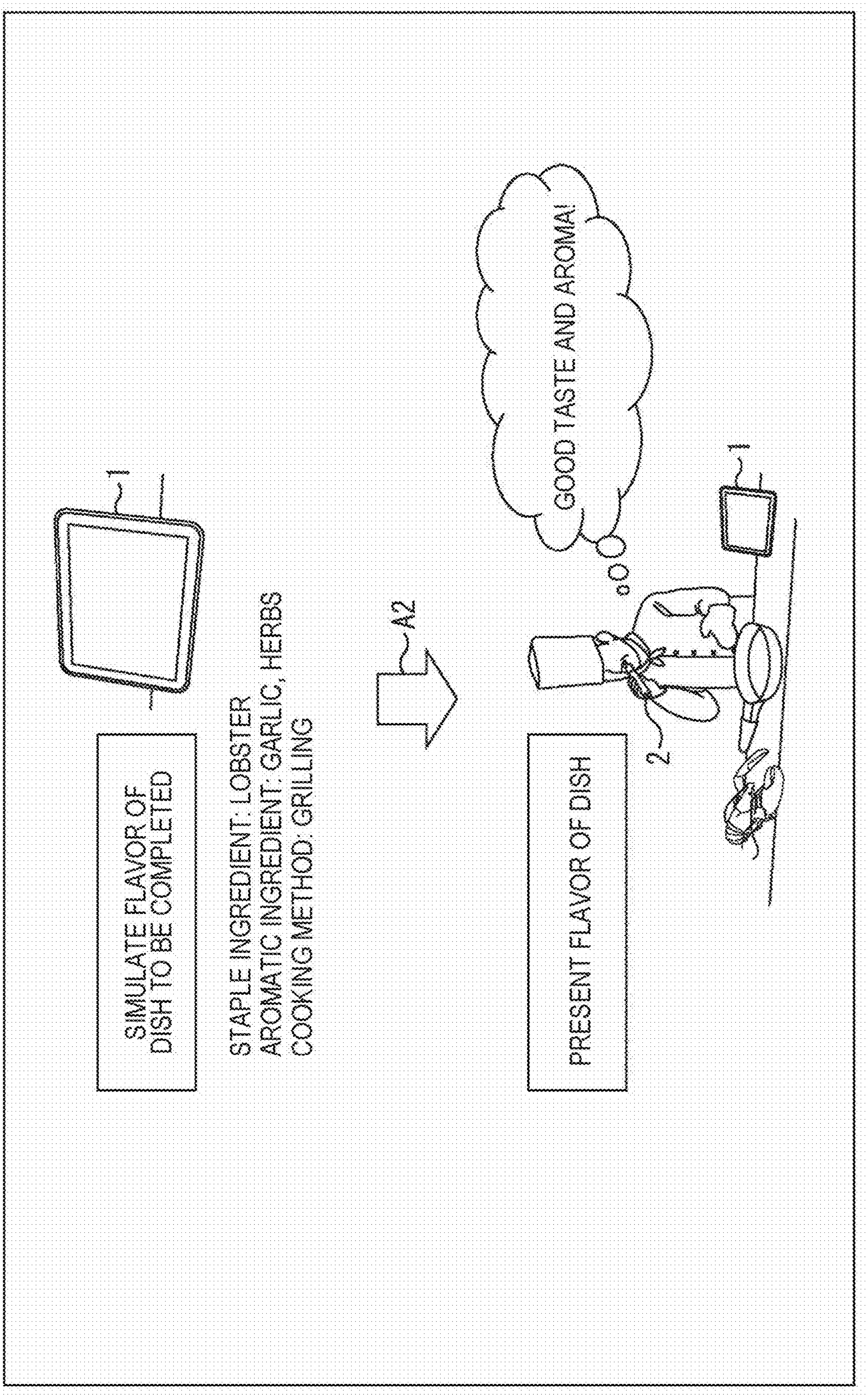
FIG. 2 is a diagram illustrating how a flavor of a dish is presented.

In a case where the ingredients and the cooking methods have been input, as illustrated in the upper part of FIG. 2, a simulation of a flavor of a dish that will be completed in a case where the ingredients selected by the chef is cooked by the cooking methods selected by the chef is performed. The simulation of the flavor is performed using, for example, an inference model generated by machine learning.

As illustrated in FIG. 3, deliciousness sensed by a human brain, that is, the "flavor" is mainly configured by combining a taste sensed by a human sense of taste and an aroma sensed by a human sense of smell. The information processing apparatus 1 simulates the taste and aroma of a dish to be completed according to the contents selected by the chef.

The flavor obtained by the simulation of the information processing apparatus 1 is presented using a flavor presentation device 2 as indicated ahead of the arrow A2 in FIG. 2. The flavor presentation system in FIG. 1 is constituted by the information processing apparatus 1 and the flavor presentation device 2.

The flavor presentation device 2 is a device connected to the information processing apparatus 1 by wire with a cable or the like or by wireless communication such as Bluetooth (registered trademark) or wireless local area network (LAN). The flavor presentation device 2 presents the taste and aroma of the dish to the chef under the control of the information processing apparatus 1.

In this manner, the flavor is presented using both of the taste and the aroma by the flavor presentation device 2. The chef is allowed to check the taste and aroma presented by the flavor presentation device 2 and determine whether or not the combination of the ingredients is good, whether or not the cooking methods are good, and the like.

Figure 4:
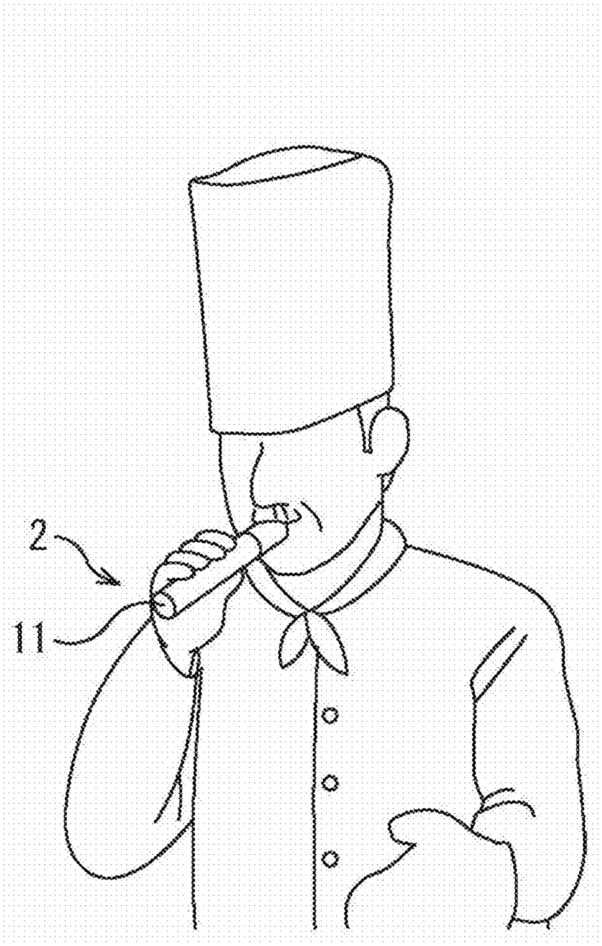
FIG. 4 is an enlarged view illustrating a use state of a flavor presentation device.

FIG. 4 is an enlarged view illustrating a use state of the flavor presentation device 2.

The flavor presentation device 2 has a housing 11 having an elongated cylindrical shape. The chef grips the housing 11 with one hand and uses the flavor presentation device 2 by putting a tip of the housing 11 into the inside of the mouth as illustrated in FIG. 4, for example.

Figure 5:
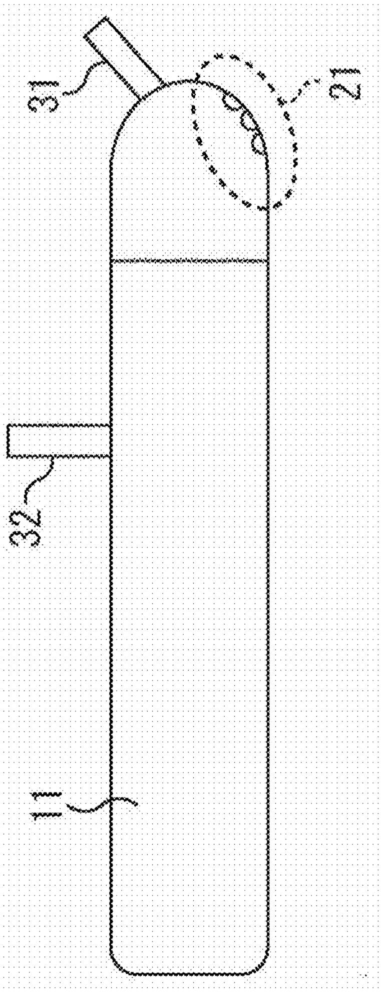
FIG. 5 is a view illustrating an appearance of the flavor presentation device.

Although details of the configuration will be described later, a taste presentation unit 21 is provided at a tip of the housing 11 as illustrated in FIG. 5. The taste presentation unit 21 is constituted by, for example, five electrodes corresponding to the basic tastes. The position of the taste presentation unit 21 has a position to be in contact with the tongue of the chef when the tip of the housing 11 is put into the inside of the mouth.

An aroma delivery nozzle 31 having a thin tubular shape is provided obliquely upward at a position close to the tip of the housing 11. In addition, an aroma delivery nozzle 32 having a thin tubular shape is provided upward at a position rearward of the tip.

Figure 6:
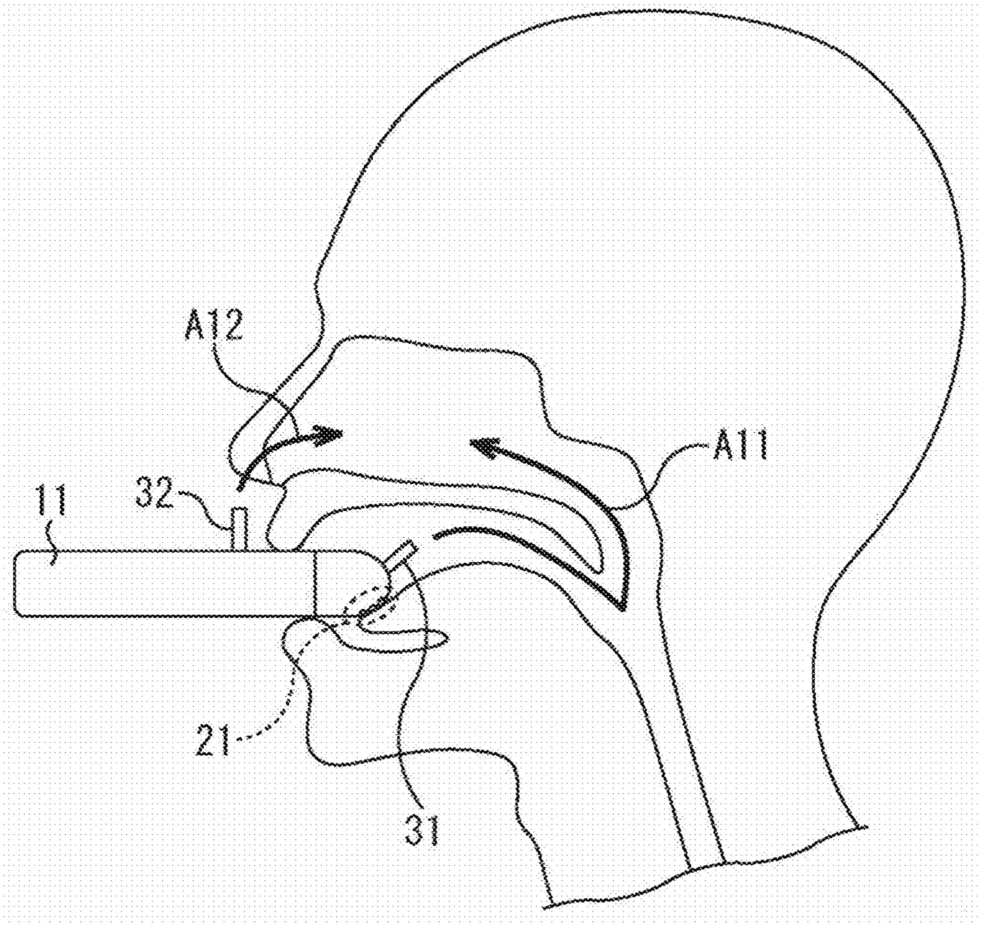
FIG. 6 is a view schematically illustrating a state when the flavor presentation device is put into the mouth.

FIG. 6 is a view schematically illustrating a state when the flavor presentation device 2 is put into the mouth.

As illustrated in FIG. 6, when the flavor presentation device 2 is put into the mouth, the tongue of the chef comes into contact with the taste presentation unit 21. The taste presentation unit 21 presents the taste as a simulation result.

In addition, when the flavor presentation device 2 is put into the mouth, the position of the aroma delivery nozzle 31 has a position inside the oral cavity of the chef. The orientation of the aroma delivery nozzle 31 is in a direction of the throat. Meanwhile, the position of the aroma delivery nozzle 32 has a position outside the mouth of the chef. The orientation of the aroma delivery nozzle 32 is in a direction of the nose.

An aroma creation unit that creates an aroma is provided inside the housing 11. An aroma (a gas including an aroma component of the dish) created in the aroma creation unit is delivered (sprayed) from the aroma delivery nozzle 31 and the aroma delivery nozzle 32. The aroma as a simulation result is presented by the aroma delivery nozzle 31 and the aroma delivery nozzle 32.

The aroma delivered from the aroma delivery nozzle 31 toward the throat reaches the nasal cavity through the back throat as indicated by the arrow A11 in FIG. 6. The aroma delivery nozzle 31 serves as a nozzle for use for the throat and for delivering an aroma in the Retronasal route. The aroma through the Retronasal is an aroma sensed as an aroma that escapes into the nose when an ingredient or a dish is put into the mouth.

Meanwhile, the aroma delivered from the aroma delivery nozzle 32 toward the nose is taken in through the nostril and reaches the nasal cavity as indicated by the arrow A12 in FIG. 6. The aroma delivery nozzle 32 serves as a nozzle for use for the nose and for delivering an aroma in the Orthonasal route. The aroma in the Orthonasal route is an aroma sensed by sucking a gas including an aroma component through the nose.

In this manner, the aroma as a simulation result is presented using aromas in two routes, namely, the aroma in the Retronasal route and the aroma in the Orthonasal route. Hereinafter, the former aroma delivered from the aroma delivery nozzle 31, which is a nozzle for use for the throat, will be appropriately referred to as an aroma through the throat. Likewise, the latter aroma delivered from the aroma delivery nozzle 32, which is a nozzle for use for the nose, will be referred to as an aroma through the nose.

In the way a person senses a flavor, the aroma is important together with the taste. By presenting the aroma together with the taste, the information processing apparatus 1 can suitably present the "flavor" of a dish to be completed according to the contents selected by the chef.

In addition, in the way a person senses an aroma, the aroma through the throat is more important than the aroma through the nose. By presenting the aroma through the throat together with the aroma through the nose, the information processing apparatus 1 can suitably present the "aroma" of a dish to be completed according to the contents selected by the chef.

From the viewpoint of the chef, there is no need to cook and actually make a dish. Even when the chef does not actually make a dish, the chef can experience the flavor of a dish to be completed by the ingredients and the cooking methods selected by the chef.

In a case where an actual dish is eaten, the structure of ingredients is changed by mastication, or the way the taste and aroma are sensed is changed due to habituation in the senses of taste and smell, or the like. As will be described later, the taste and aroma are presented by the flavor presentation device 2 such that the sensed taste and aroma change with the passage of time. A change in taste and a change in aroma when an actual dish is eaten are expressed by the flavor presentation device 2. The chef can experience a flavor close to the flavor when eating the actual dish.

A series of processes relating to presentation of the flavor as described above will be described later.

<<Configuration and Working of Each Apparatus>>

<Information Processing Apparatus 1>

Configuration of Information Processing Apparatus 1

Figure 7:
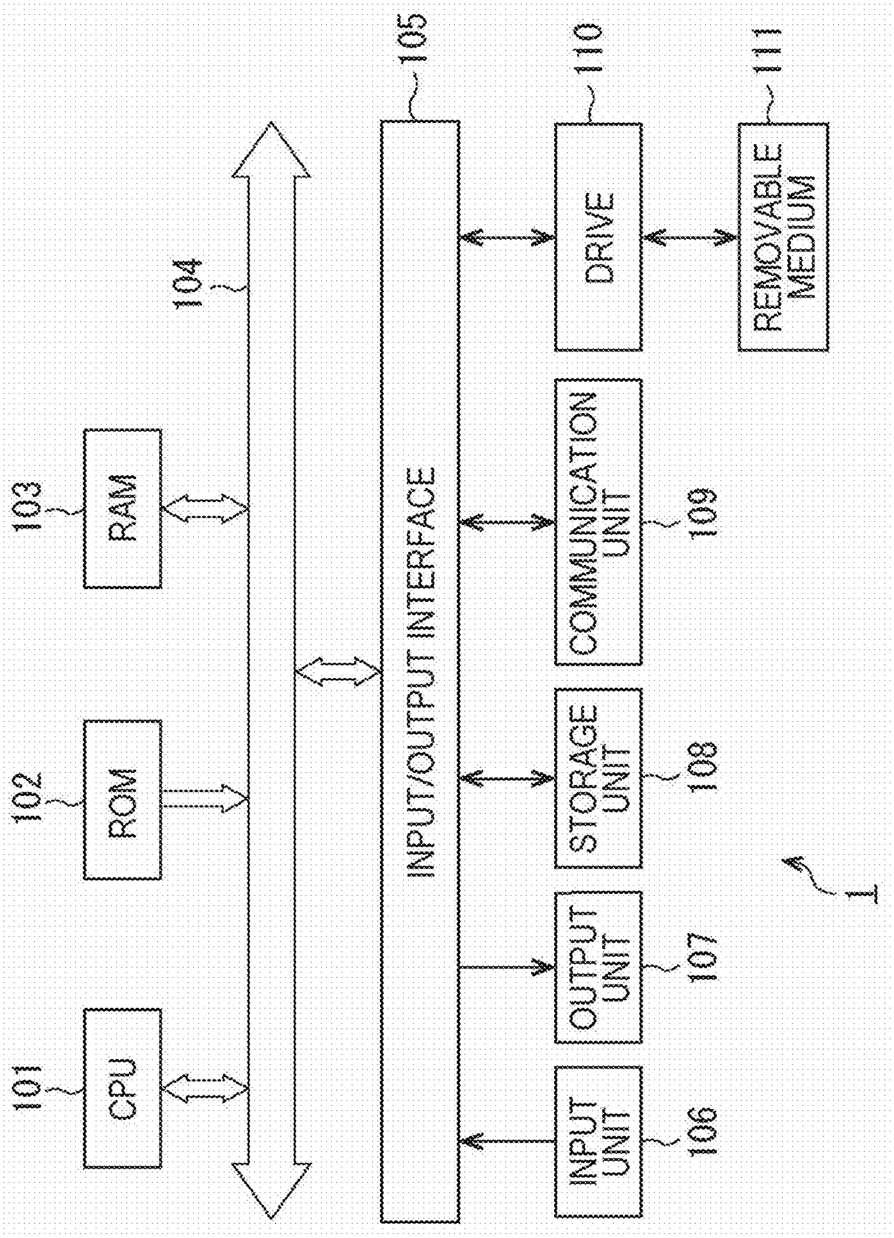
FIG. 7 is a block diagram illustrating an example of a hardware configuration of an information processing apparatus.

FIG. 7 is a block diagram illustrating an example of a hardware configuration of the information processing apparatus 1.

As illustrated in FIG. 7, the information processing apparatus 1 is constituted by a computer. A central processing unit (CPU) 101, a read only memory (ROM) 102, and a random access memory (RAM) 103 are interconnected by a bus 104.

An input/output interface 105 is further connected to the bus 104. An input unit 106 including a touch panel provided to overlap a display, a keyboard, a mouse, and the like, and an output unit 107 including a display, a speaker, and the like are connected to the input/output interface 105.

In addition, a storage unit 108 including a hard disk, a non-volatile memory, and the like, a communication unit 109 including a network interface and the like, and a drive 110 that drives a removable medium 111 are connected to the input/output interface 105.

For example, various processes such as presentation of a flavor are performed by the CPU 101 loading a program stored in the storage unit 108 into the RAM 103 via the input/output interface 105 and the bus 104 and executing the program.

Figure 8:
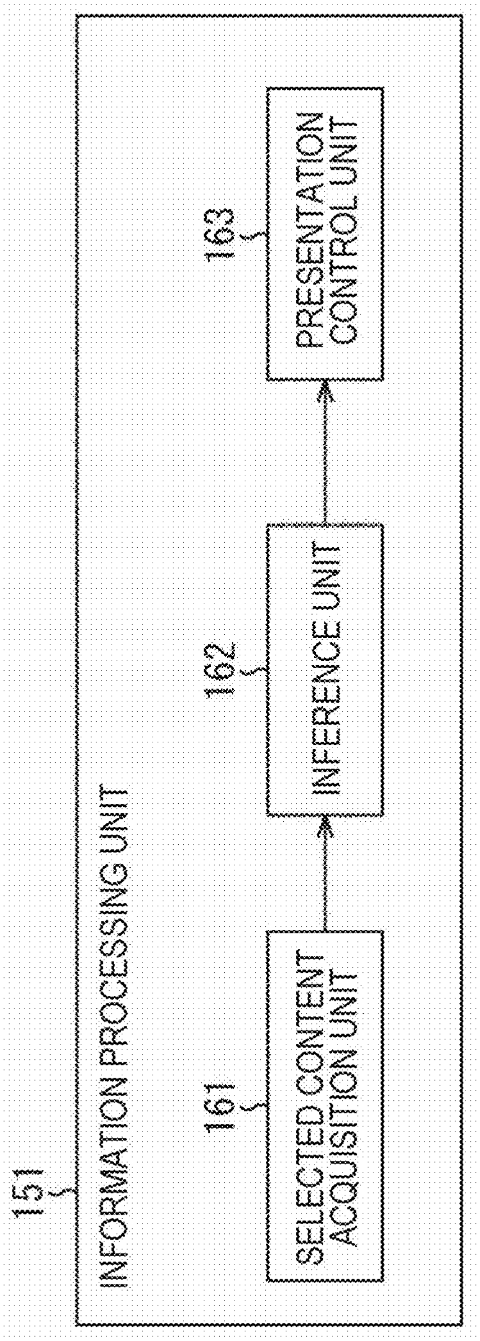
FIG. 8 is a block diagram illustrating a functional configuration example of the information processing apparatus.

FIG. 8 is a block diagram illustrating a functional configuration example of the information processing apparatus 1.

As illustrated in FIG. 8, an information processing unit 151 is implemented in the information processing apparatus 1. The information processing unit 151 is constituted from a selected content acquisition unit 161, an inference unit 162, and a presentation control unit 163. At least a part of the functional units illustrated in FIG. 8 is implemented by the CPU 101 in FIG. 7 executing a predetermined program.

The selected content acquisition unit 161 accepts an operation by the chef and acquires the contents selected by the chef regarding the ingredients and the cooking methods. The selected content acquisition unit 161 outputs information representing the contents selected by the chef to the inference unit 162.

The inference unit 162 infers control information for presenting the flavor of the simulation dish on the basis of the information supplied from the selected content acquisition unit 161. The simulation dish is a virtual dish that will be completed in a case where the ingredients selected by the chef are cooked by the cooking methods selected by the chef. Since the flavor is presented on the basis of the control information, inferring the control information corresponds to simulating the flavor to be presented to the chef.

In the inference unit 162, an inference model used to present the flavor of the simulation dish is prepared. The inference model is constituted by a neural network or the like generated in advance by machine learning.

Figure 9:
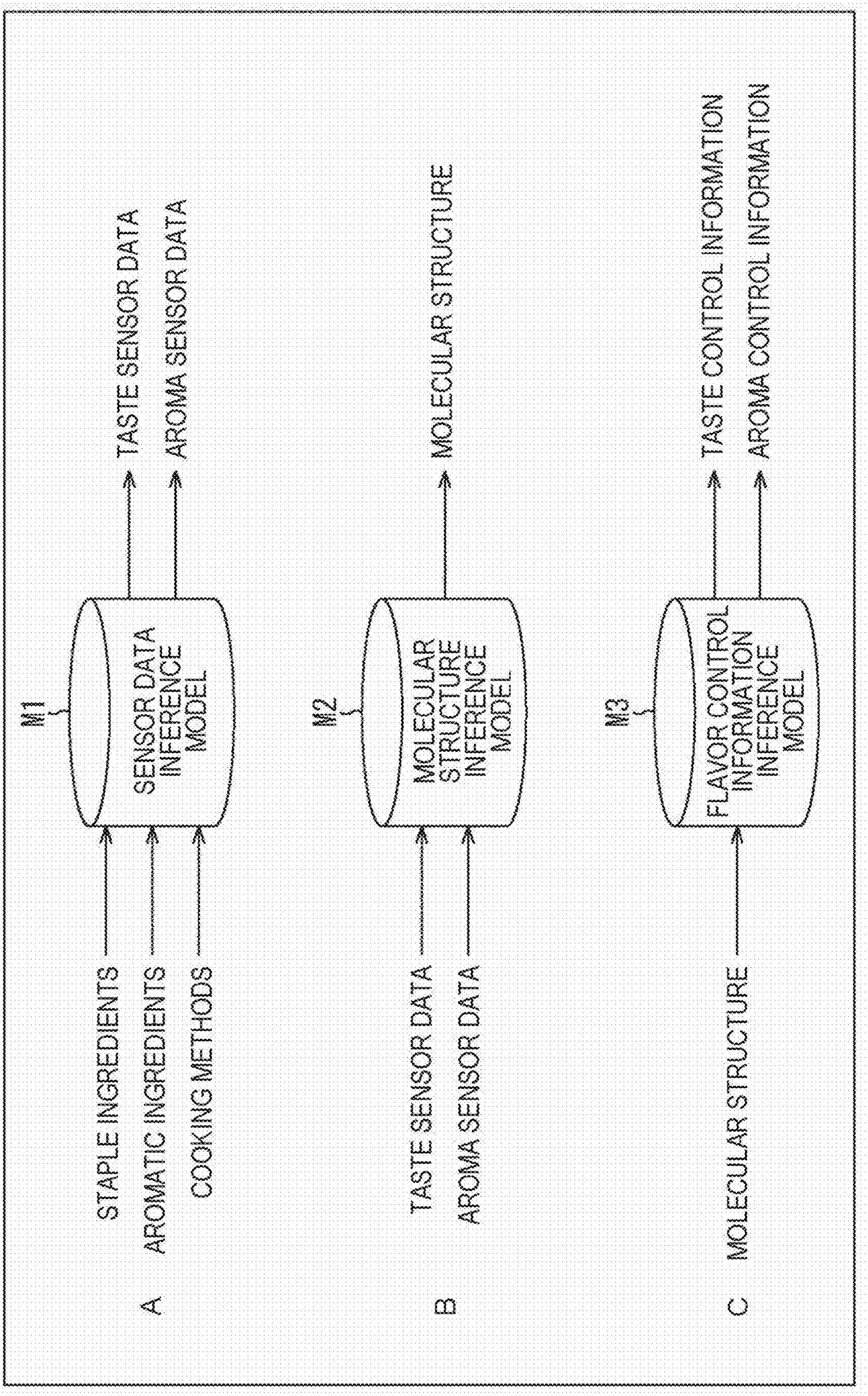
FIG. 9 is a diagram illustrating an example of inference models included in an inference unit.

FIG. 9 is a diagram illustrating an example of the inference models included in the inference unit 162.

As illustrated in A to C of FIG. 9, for example, three types of inference models, namely, a sensor data inference model M1, a molecular structure inference model M2, and a flavor control information inference model M3 are prepared in the inference unit 162.

The sensor data inference model M1 is an inference model whose input is information on the ingredients and information on the cooking methods and whose output is taste sensor data and aroma sensor data. The information on the ingredients selected by the chef and the information on the cooking methods selected by the chef are input to the sensor data inference model M1. As the information on the ingredients, for example, information on the staple ingredient and information on the aromatic ingredient are input.

The taste sensor data is sensor data representing the taste of the simulation dish. As will be described later, learning of the sensor data inference model M1 is performed using taste sensor data obtained by measuring the taste of a variety of dishes with a taste measurement apparatus.

The aroma sensor data is sensor data representing the aroma of the simulation dish. Learning of the sensor data inference model M1 is performed using aroma sensor data obtained by measuring aromas of a variety of dishes with an aroma measurement apparatus.

The molecular structure inference model M2 is an inference model whose input is the taste sensor data and the aroma sensor data and whose output is molecular structure information. The molecular structure information is information representing the type and amount of the molecular structure of the simulation dish. On the premise that a dish having a specific molecular structural design has a specific flavor, learning of the molecular structure inference model M2 is performed using information on measurement results for molecular structural designs of a variety of dishes.

The flavor control information inference model M3 is an inference model whose input is the molecular structure and whose output is taste control information and aroma control information.

The taste control information is information that controls presentation of the taste by the flavor presentation device 2. By driving the flavor presentation device 2 in accordance with the contents of the taste control information, the taste is presented to the chef.

The aroma control information is information that controls presentation of the aroma by the flavor presentation device 2. By driving the flavor presentation device 2 in accordance with the contents of the aroma control information, the aroma is presented to the chef.

The inference unit 162 outputs, to presentation control unit 163, the taste control information and the aroma control information obtained by performing inference based on the information supplied from selected content acquisition unit 161.

Note that each of the taste sensor data, the aroma sensor data, the molecular structure information, the taste control information, and the aroma control information used as input and output of the inference models is time-series information.

The taste sensor data is time-series sensor data representing a change in taste of the simulation dish, and the aroma sensor data is time-series sensor data representing a change in aroma of the simulation dish. The molecular structure information is time-series information representing a change in the molecular structural design of the simulation dish. The taste control information is time-series information representing a change in the presented content of the taste, and the aroma control information is time-series information representing a change in the presented content of the aroma.

The presentation control unit 163 in FIG. 8 drives the flavor presentation device 2 in accordance with the taste control information supplied from the inference unit 162 and controls presentation of the taste. In addition, the presentation control unit 163 drives the flavor presentation device 2 in accordance with the aroma control information supplied from the inference unit 162 and controls presentation of the aroma.

Working of Information Processing Apparatus 1

Figure 10:
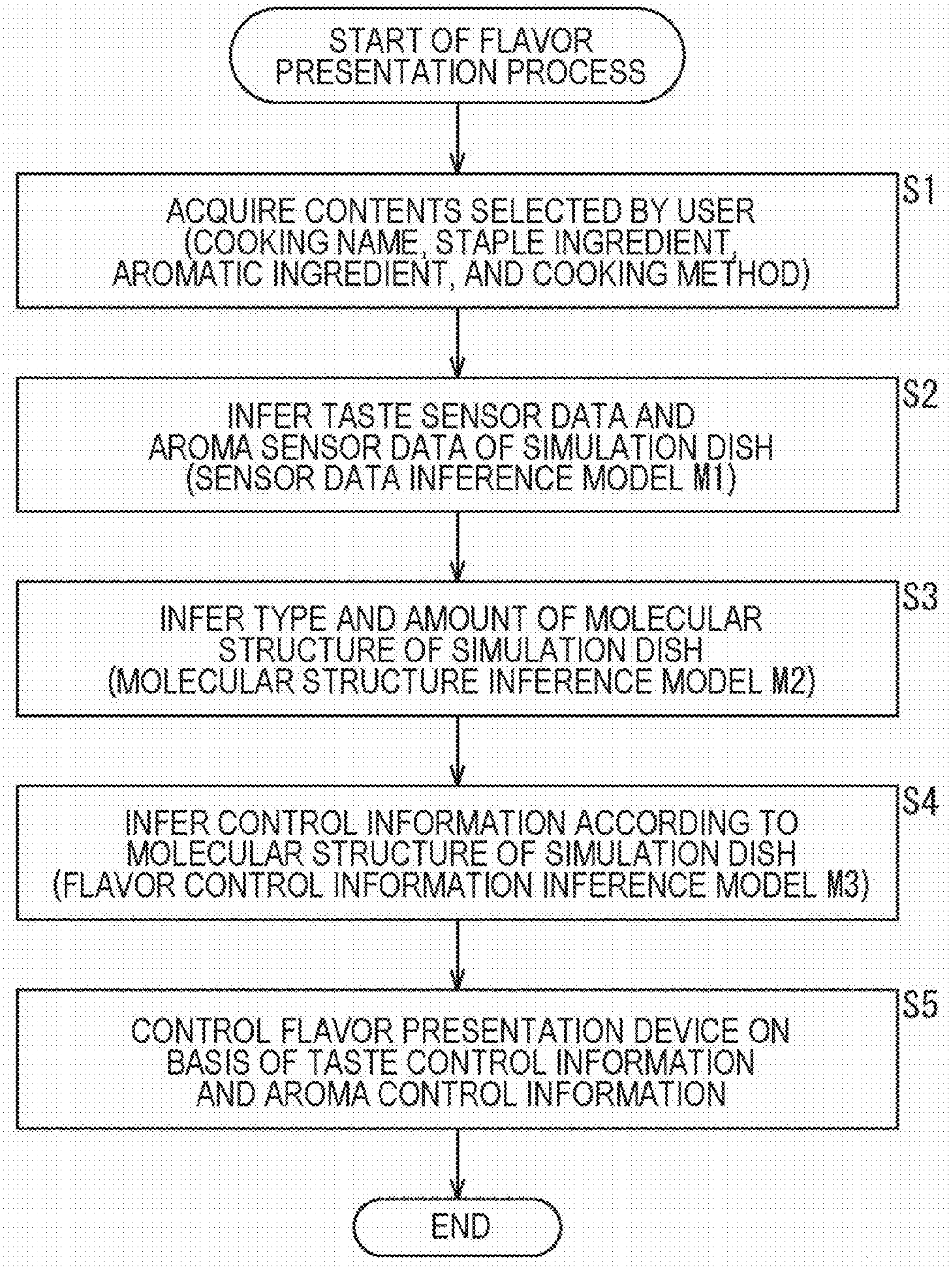
FIG. 10 is a flowchart explaining a flavor presentation process.

A flavor presentation process of the information processing apparatus 1 having the configuration as explained above will be described with reference to the flowchart in FIG. 10. The process in FIG. 10 is started when an ingredient and a cooking method are selected by the chef. Other information regarding the simulation dish, such as a cooking name, is also selected as appropriate.

In step S1, the selected content acquisition unit 161 acquires the cooking name, the staple ingredient, the aromatic ingredient, and the cooking method selected by the chef, as the contents selected by the chef.

In step S2, the inference unit 162 uses the sensor data inference model M1 to infer the taste sensor data and the aroma sensor data of the simulation dish.

In step S3, the inference unit 162 uses the molecular structure inference model M2 to infer the type and amount of the molecular structure of the simulation dish.

In step S4, the inference unit 162 uses the flavor control information inference model M3 to infer the control information according to the molecular structure of the simulation dish.

In step S5, the presentation control unit 163 controls the flavor presentation device 2 on the basis of the taste control information and the aroma control information obtained by the inference unit 162 performing inference.

Through the above process, the chef can check the taste and aroma of the completed dish without actually eating the dish.

<Flavor Presentation Device 2>

Figure 11:
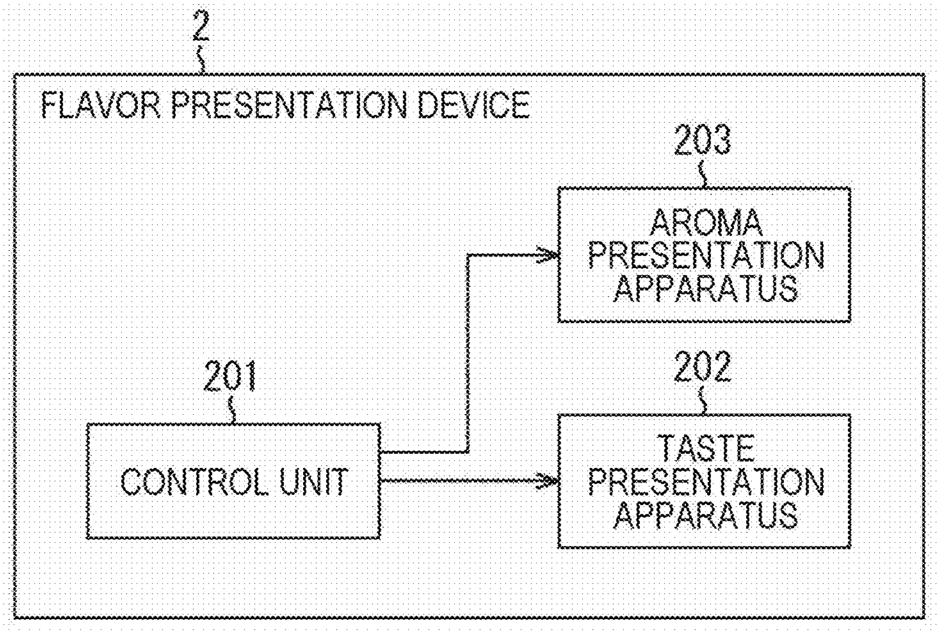
FIG. 11 is a block diagram illustrating a configuration example of the flavor presentation device.

FIG. 11 is a block diagram illustrating a configuration example of the flavor presentation device 2.

As illustrated in FIG. 11, the flavor presentation device 2 is constituted by a control unit 201, a taste presentation apparatus 202, and an aroma presentation apparatus 203. An apparatus having a taste presentation function and an apparatus having an aroma presentation function are provided in one housing.

The control unit 201 is constituted by a CPU, a ROM, a RAM, and the like. The control unit 201 executes a predetermined program with the CPU and controls the overall working of the flavor presentation device 2.

For example, the control unit 201 receives the taste control information and the aroma control information transferred from the information processing apparatus 1. The control unit 201 controls presentation of the flavor of the simulation dish by outputting the taste control information to the taste presentation apparatus 202 and outputting the aroma control information to the aroma presentation apparatus 203. Under the control of the control unit 201, the type and strength of the taste to be presented to the chef and the type and strength of the aroma to be presented to the chef at each time are adjusted.

The taste presentation apparatus 202 presents the taste of the simulation dish to the chef in accordance with the taste control information supplied from the control unit 201. As the taste presentation apparatus 202, for example, an apparatus to which the technology described in Non-Patent Document 1 is applied can be used.

The aroma presentation apparatus 203 presents the aroma of the simulation dish to the chef in accordance with the aroma control information supplied from the control unit 201.

Figure 12:
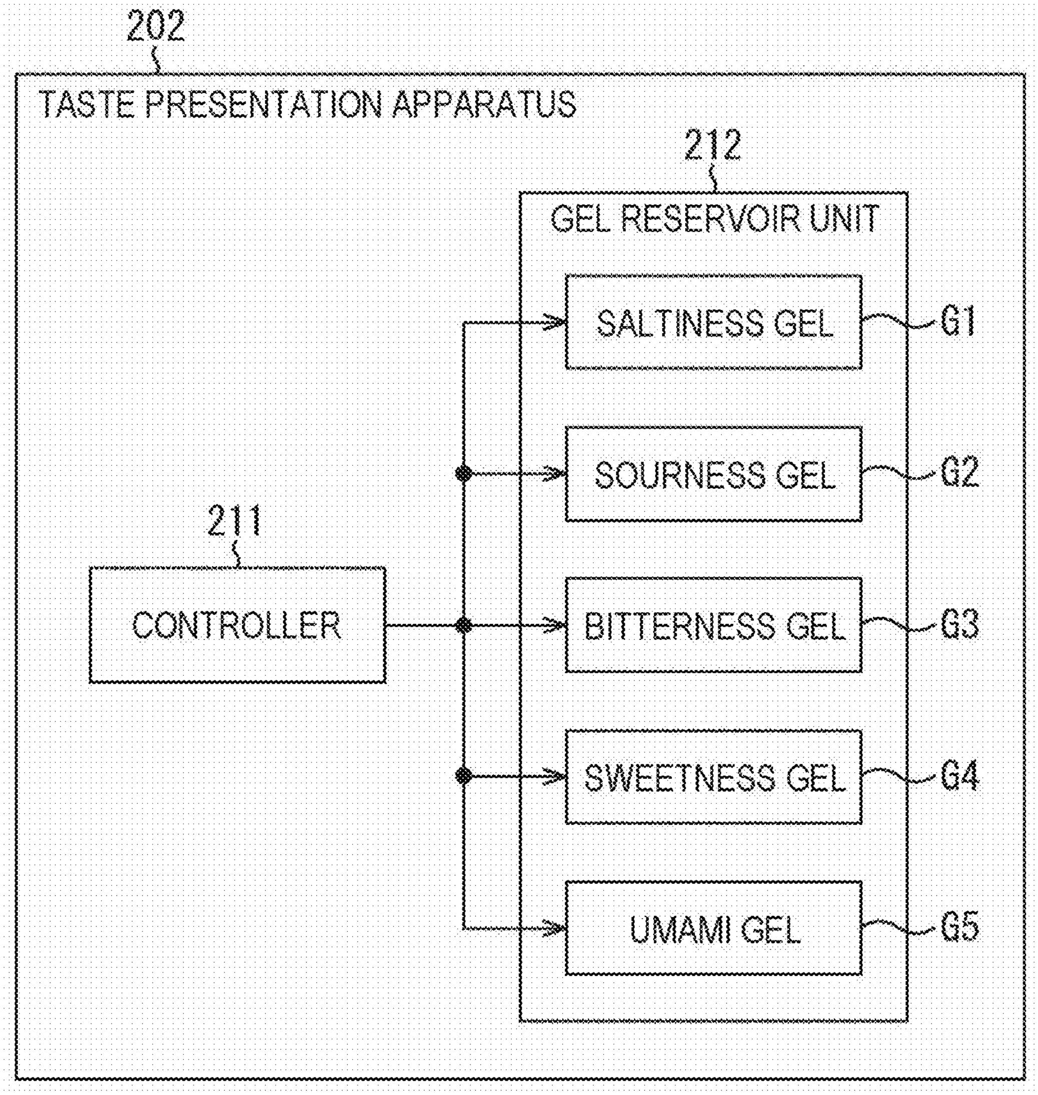
FIG. 12 is a block diagram illustrating a configuration example of a taste presentation apparatus in FIG. 11.

FIG. 12 is a block diagram illustrating a configuration example of the taste presentation apparatus 202.

As illustrated in FIG. 12, the taste presentation apparatus 202 is provided with a controller 211 and a gel reservoir unit 212.

The gel reservoir unit 212 holds a saltiness gel G1, a sourness gel G2, a bitterness gel G3, a sweetness gel G4, and an umami gel G5 including electrolytes that allow each taste of the saltiness, sourness, bitterness, sweetness, and umami, which are the five basic tastes, to be sensed. When the flavor presentation device 2 is put into the mouth, the tips of the saltiness gel G1 to the umami gel G5 come into contact with the tongue of the chef. For example, the tips of the saltiness gel G1 to the umami gel G5 constitute the taste presentation unit 21 (FIG. 5).

For example, a gel containing sodium chloride is used as the saltiness gel G1, and a gel containing citric acid is used as the sourness gel G2. A gel containing magnesium chloride is used as the bitterness gel G3, and a gel containing glycine is used as the sweetness gel G4. A gel containing glutamic sodium is used as the umami gel G5.

The controller 211 applies a voltage to each of the saltiness gel G1 to the umami gel G5 to move ions inside the gel and controls the amount of ions to touch the tongue. When ions touch the tongue, the chef senses a taste. The controller 211 generates a taste of the simulation dish by adjusting the ratio and the amount of each taste of the saltiness, sourness, bitterness, sweetness, and umami on the basis of the taste control information and presents the generated taste to the chef.

Figure 13:
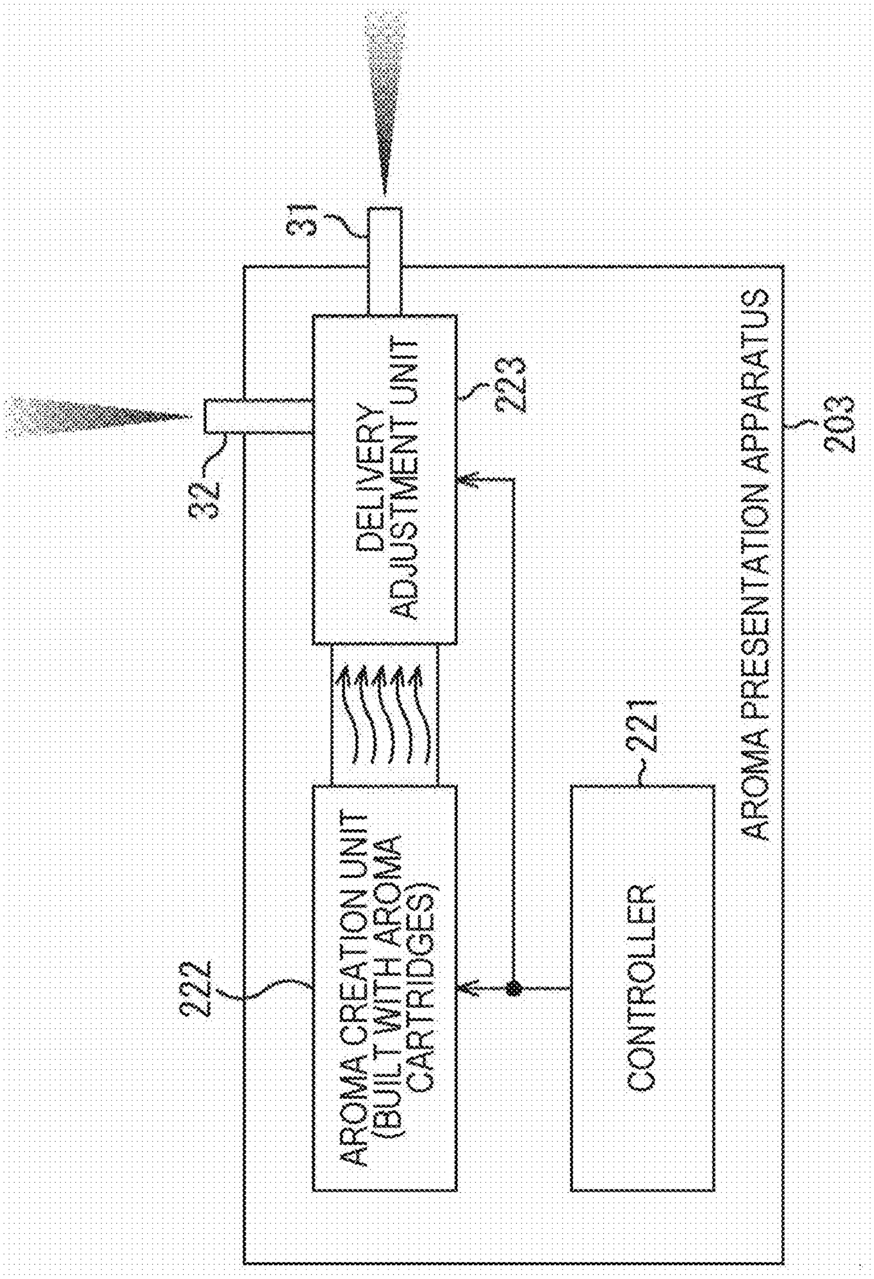
FIG. 13 is a block diagram illustrating a configuration example of an aroma presentation apparatus in FIG. 11.

FIG. 13 is a block diagram illustrating a configuration example of the aroma presentation apparatus 203.

As illustrated in FIG. 13, the aroma presentation apparatus 203 is provided with a controller 221, an aroma creation unit 222, and a delivery adjustment unit 223.

The controller 221 controls the aroma creation unit 222 to deliver the vaporized essence from any aroma cartridge. A plurality of aroma cartridges is built in the aroma creation unit 222. The respective aroma cartridges are packed with essences that are aroma components different from each other. The aroma (vaporized essence) created in the aroma creation unit 222 is sent to the delivery adjustment unit 223.

A flow channel toward the aroma delivery nozzle 31 and a flow channel toward the aroma delivery nozzle 32 from the aroma creation unit 222 are provided inside the delivery adjustment unit 223. The aroma sent from the delivery adjustment unit 223 is delivered as the aroma through the throat from the aroma delivery nozzle 31 by passing through one flow channel and is delivered as the aroma through the nose from the aroma delivery nozzle 32 by passing through the other flow channel.

In addition, a switching valve that switches the flow and amount of the aroma is provided inside the delivery adjustment unit 223. The controller 221 adjusts the amount and delivery timing of each of the aroma through the throat delivered from the aroma delivery nozzle 31 and the aroma through the nose delivered from the aroma delivery nozzle 32 by controlling driving of the switching valve.

Figure 14:
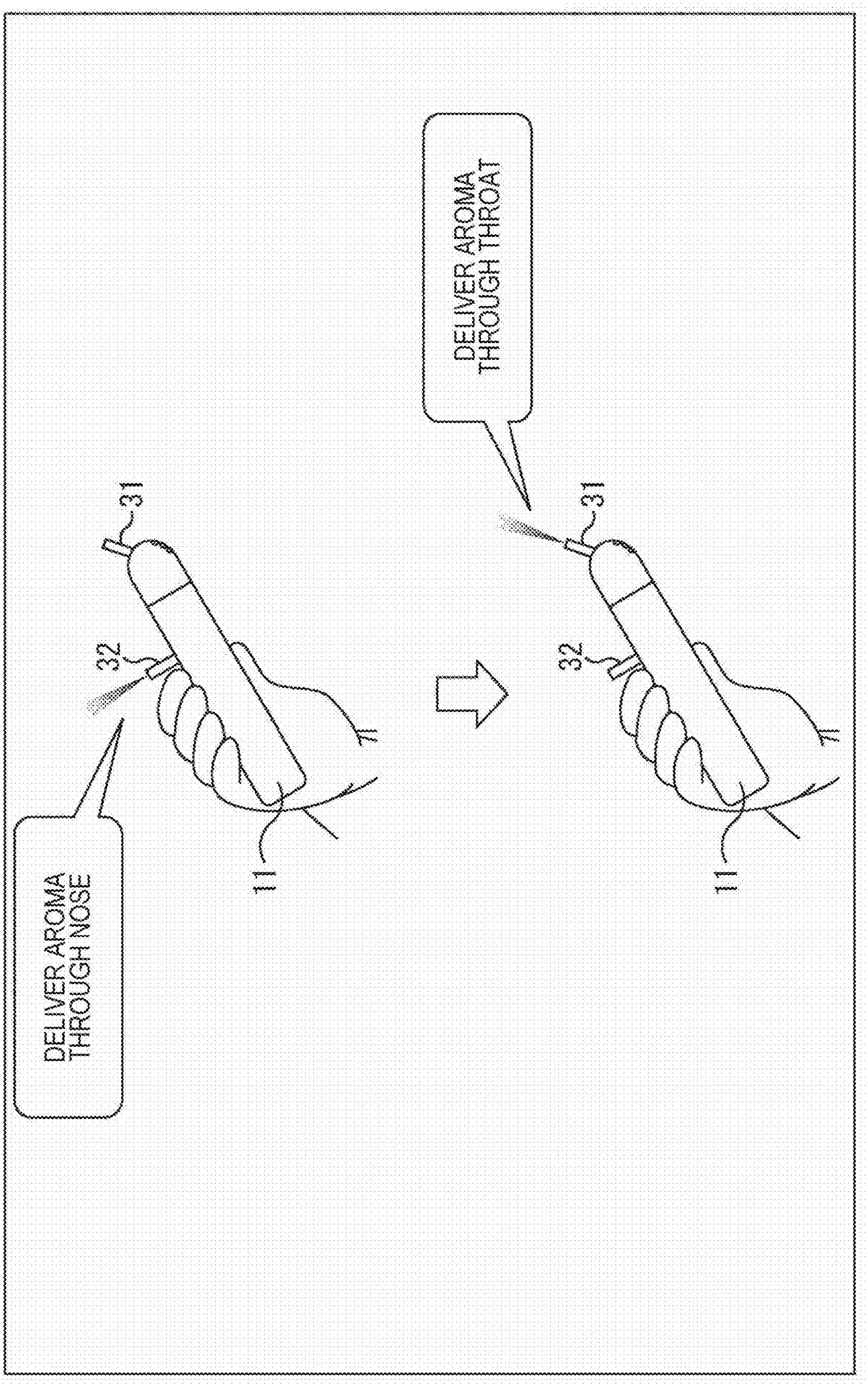
FIG. 14 is a diagram illustrating timings of presenting aromas.

For example, the aroma of a certain simulation dish is presented in such a manner that the aroma through the nose is delivered from the aroma delivery nozzle 32, and thereafter, the aroma through the throat is delivered from the aroma delivery nozzle 31, as illustrated in the balloon in FIG. 14.

In a case where a person actually eats a dish, the person first senses the aroma in the Orthonasal route and senses the aroma in the Retronasal route after putting the dish into the inside of the mouth. By adjusting the amount and delivery timing of each of the aroma through the throat and the aroma through the nose, the same way of sensing the aroma as the way of sensing the aroma when actually eating a dish is reproduced.

In the above, the nozzles having a thin tubular shape are assumed to be provided as delivery units for each of the aroma through the throat and the aroma through the nose, but each of the delivery units is not limited in shape to one having a thin tube-like shape. The delivery units having various shapes, such as delivery units formed by hole portions formed at different positions, can be assumed as the delivery units for each of the aroma through the throat and the aroma through the nose.

<Temporal Change in Flavor>

In a case where a person eats an actual dish, the taste and aroma sensed by the person change like an initial stimulus, an intermediate-time stimulus, and a final stimulus. The taste and the aroma are presented by the flavor presentation device 2 such that the presented content changes with the passage of time.

The change in taste is expressed, for example, by changing at least one of the type or strength of the taste to be presented. In addition, the change in aroma is expressed, for example, by changing at least one of the type or strength of the aroma to be presented.

Figure 15:
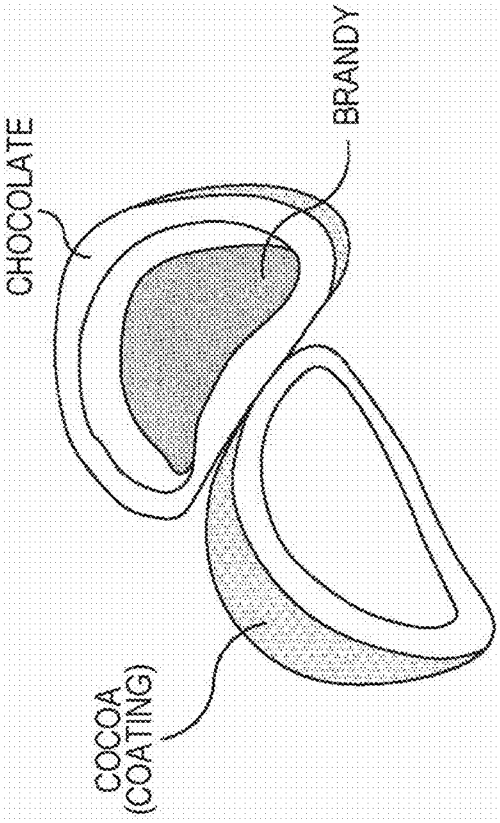
FIG. 15 is a diagram illustrating an example of a simulation dish.

The temporal change in flavor in a case where the bonbon chocolat illustrated in FIG. 15 is assumed as a simulation dish will be described. The bonbon chocolat is a chocolate confection with a filling inside. In the example in FIG. 15, brandy is filled inside, and the entire chocolate is coated with cocoa powder.

When the chef selects "chocolate", "brandy", "cocoa powder", and the like as ingredients and selects cooking methods such as "filling chocolate with a small amount of brandy" and "coating with cocoa powder", a flavor with the bonbon chocolat as a simulation dish as illustrated in FIG. 15 will be presented.

In these circumstances, for example, the taste is presented such that the cocoa taste is mainly presented as an initial stimulus. After the presentation of the cocoa taste, the chocolate taste is mainly presented as an intermediate-time stimulus. During the transition from the initial stimulus to the intermediate-time stimulus, a taste obtained by mixing the cocoa taste and the chocolate taste is presented.

After the presentation of the chocolate taste, the brandy taste is mainly presented as a final stimulus. During the transition from the intermediate-time stimulus to the final stimulus, a taste obtained by mixing the chocolate taste and the brandy taste is presented.

Meanwhile, the aroma is presented such that a cocoa aroma is presented as an initial stimulus. The cocoa aroma is first presented using the aroma through the nose and thereafter, presented using the aroma through the throat.

After the presentation of the cocoa aroma, the chocolate aroma is mainly presented as an intermediate-time stimulus. During the transition from the initial stimulus to the intermediate-time stimulus, an aroma obtained by mixing the cocoa aroma and the chocolate aroma is presented. In order to express the aroma after the bonbon chocolat is put into the mouth, the aroma during transition in which the cocoa aroma and the chocolate aroma are mixed and the chocolate aroma at the intermediate time are presented using the aroma through the throat.

After the presentation of the chocolate aroma, the brandy aroma is mainly presented as a final stimulus. During the transition from the intermediate-time stimulus to the final stimulus, an aroma obtained by mixing the chocolate aroma and the brandy aroma is presented. In order to express the aroma after the bonbon chocolat is put into the mouth, the aroma during transition in which the chocolate aroma and the brandy aroma are mixed and the final brandy aroma are presented using the aroma through the throat.

By expressing a change in taste and a change in aroma when eating the actual dish as described above, the chef can experience a flavor close to the flavor when eating the actual dish.

<<Learning of Inference Model>>

<Configuration of Learning Apparatus>

Learning of the inference model prepared in the information processing apparatus 1 will be described.

Figure 16:
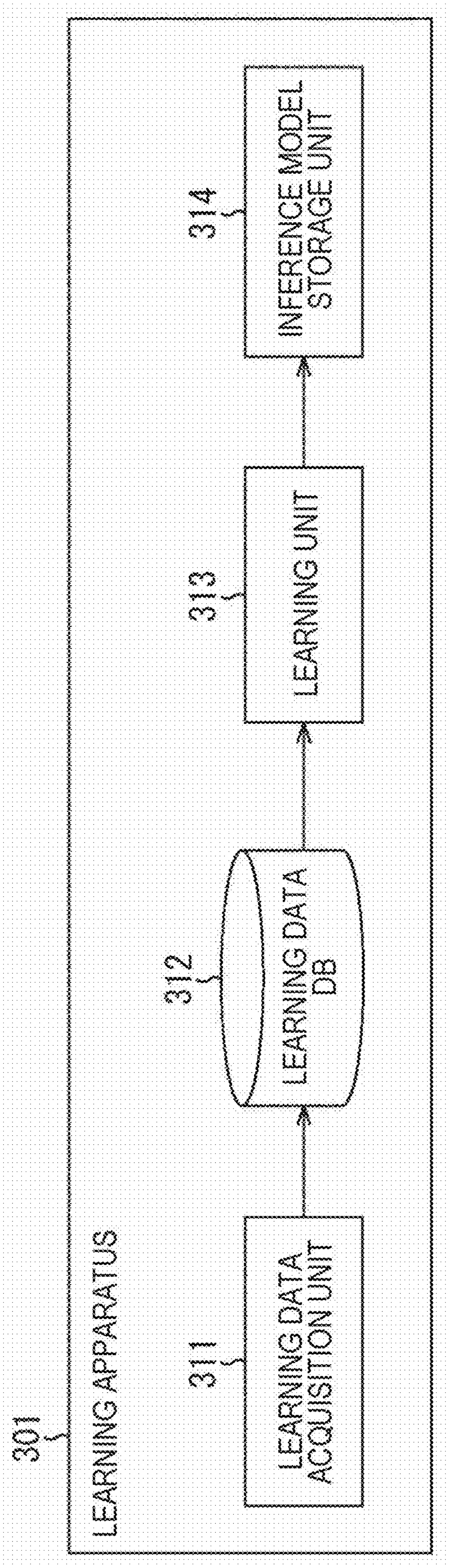
FIG. 16 is a block diagram illustrating a functional configuration example of a learning apparatus.

FIG. 16 is a block diagram illustrating a functional configuration example of a learning apparatus.

In a learning apparatus 301, a learning data acquisition unit 311, a learning data database (DB) 312, a learning unit 313, and an inference model storage unit 314 are implemented. The learning apparatus 301 has, for example, the same configuration as the hardware configuration of the information processing apparatus 1 illustrated in FIG. 7. The configuration illustrated in FIG. 7 will be cited and described as the configuration of the learning apparatus 301 as appropriate. At least a part of the respective constituent members illustrated in FIG. 16 is implemented by the CPU 101 constituting the learning apparatus 301 by executing a predetermined program.

The learning data acquisition unit 311 acquires learning data used for learning of the inference model. Various pieces of the learning data including dish information are input by a learner for the inference model.

FIG. 17 is a diagram illustrating an example of the dish information.

As illustrated in FIG. 17, the dish information in which a category of a staple ingredient, a sub-category of the staple ingredient, a cooking method, an aromatic ingredient, and a recipe are associated is input as learning data. The recipe is information regarding a cooking stage and the like for making each dish. In the recipe, information such as a cooking name, the type and amount of a staple ingredient, the type and amount of an aromatic ingredient, the way of cutting the staple ingredient, and a heating method (temperature, time, and the like) is described.

The learning data acquisition unit 311 in FIG. 16 acquires the dish information including these pieces of information and stores the dish information in the learning data DB 312 as learning data.

Information such as the taste sensor data, the aroma sensor data, the molecular structure information, the taste control information, and the aroma control information is also input as learning data to the learning data acquisition unit 311. The learning data acquisition unit 311 acquires the input information and stores the acquired information in the learning data DB 312 as learning data. Details of the information acquired by the learning data acquisition unit 311 will be described later.

The learning unit 313 reads the learning data from the learning data DB 312 and performs learning of the inference model. The sensor data inference model M1, the molecular structure inference model M2, and the flavor control information inference model M3 are generated by learning using the learning data. The learning unit 313 outputs the inference models generated by learning to the inference model storage unit 314 and stores the output inference models in the inference model storage unit 314. The inference models stored in the inference model storage unit 314 are provided to the information processing apparatus 1 and used to present the flavor of the simulation dish.

<Generation of Learning Data>

Figure 18:
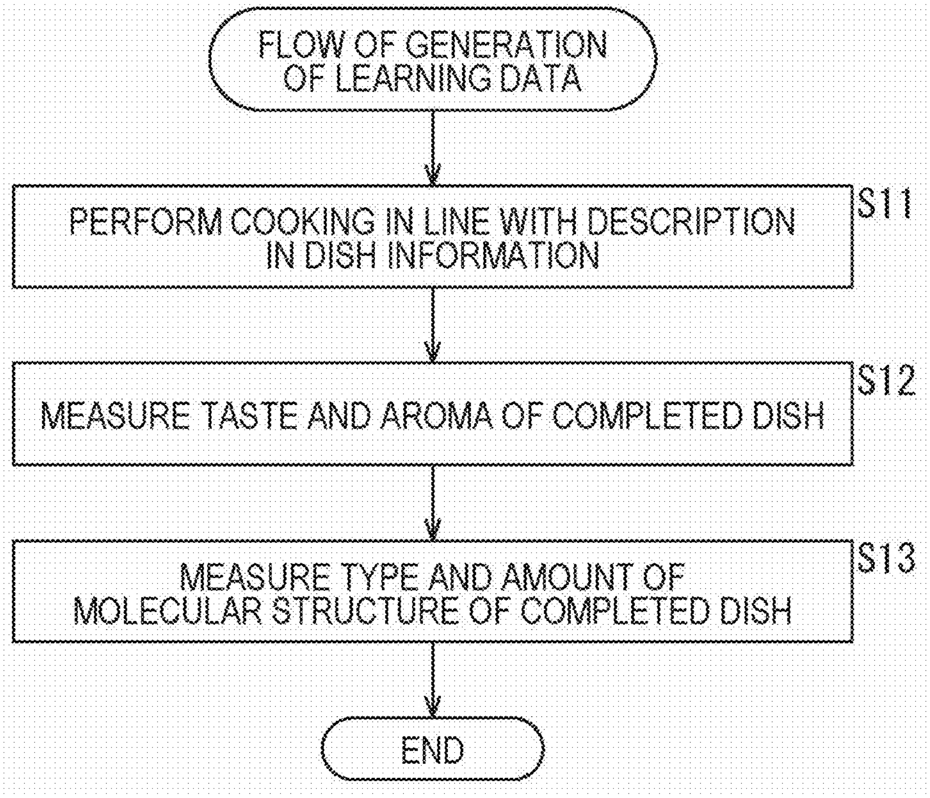
FIG. 18 is a flowchart explaining a flow of generation of learning data.

A flow of generation of the learning data to be input to the learning apparatus 301 will be described with reference to the flowchart in FIG. 18. The process illustrated in FIG. 18 is performed using, for example, an apparatus different from the learning apparatus 301.

In step S11, cooking is performed in line with the description in the dish information. This process is a process performed by a person. For example, in a case where information on a recipe with lobster as a staple ingredient is prepared as dish information, the lobster is cooked in line with the recipe.

In step S12, the taste and aroma of the completed dish are measured. The taste and aroma are measured using a measurement apparatus. For example, each of the type and strength of the taste and the type and strength of the aroma are measured using a measurement apparatus. The type of the taste is represented by, for example, five basic tastes. In addition, the type of the aroma is represented by, for example, the type of the aroma substance.

In step S13, the molecular structure of the completed dish is measured. For example, the type and amount of the molecular structure are measured using a measurement apparatus.

Figure 19:
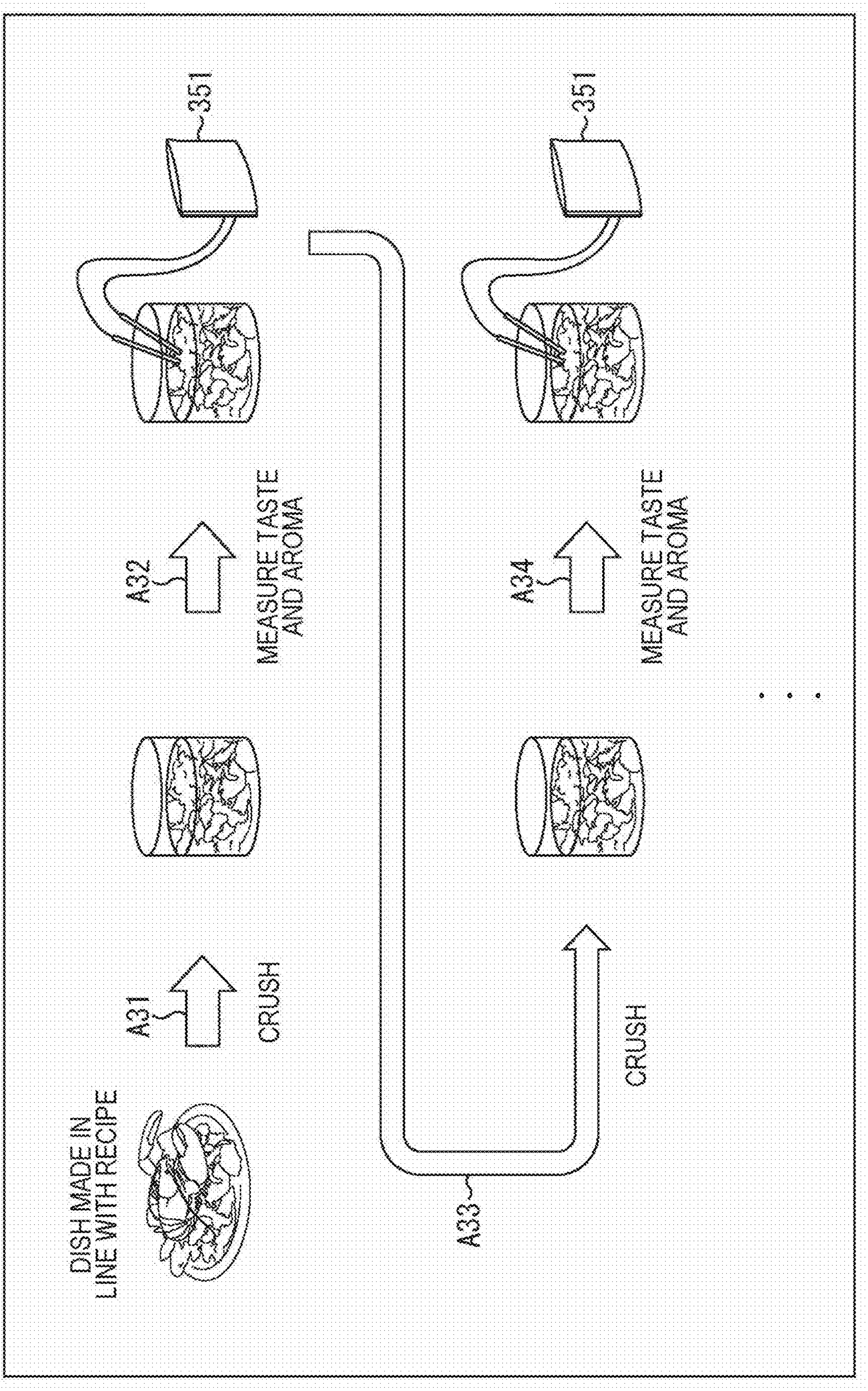
FIG. 19 is a diagram illustrating an example of measurement.

FIG. 19 is a diagram illustrating an example of measurement.

The dish completed by cooking in line with the recipe is crushed as indicated ahead of the arrow A31.

In addition, as indicated ahead of the arrow A32, the taste and aroma are measured with the crushed dish as an object, using a measurement apparatus 351. In the example in FIG. 19, a probe is inserted into a container into which the crushed dish has been put, and measurement is performed. The taste, aroma, and molecular structure measurements are made at the same timing.

The measurement apparatus 351 is an apparatus including a taste sensor, an aroma sensor, and a molecular structure sensor.

As the taste sensor, for example, an artificial lipid membrane type taste sensor using an artificial lipid membrane for a sensor unit is used. The artificial lipid membrane type taste sensor is a sensor that detects a change in membrane potential arising from electrostatic interaction or hydrophobic interaction of a lipid membrane with a taste substance, which is a substance causing a taste to be sensed, and outputs the detected change as a sensor value.

The sensor value output from the taste sensor of the measurement apparatus 351 is acquired by a computer as taste sensor data. For example, the taste sensor data representing each taste of the saltiness, sourness, bitterness, sweetness, and umami is acquired.

As a method for estimating the taste, there is a change of membrane potential by adsorption (CPA) estimation method. Taste estimation by the CPA estimation method is performed with the stages as follows.

Stage (1): The taste sensor is immersed in a reference liquid to obtain a membrane potential Vr.

Stage (2): The taste sensor is immersed in a dish that is a sample. At this time, the membrane potential changes to Vs by the interaction with the taste substance. The change Vs−Vr in the membrane potential corresponds to a pre-taste such as the sourness or the saltiness.

Stage (3): The taste sensor is rinsed with a reference liquid to be used later.

Stage (4): The taste sensor is immersed in the same reference liquid to obtain a membrane potential Vr'. In a case where a bitter substance, an astringent substance, or the like is adsorbed on a surface of the lipid membrane in the stage (3), the membrane potential becomes Vr'. The change Vr'−Vr in membrane potential is called "CPA value" and corresponds to an aftertaste such as the bitterness and astringency.

Instead of the artificial lipid membrane type taste sensor, various apparatuses such as a taste sensor using a polymer membrane can be used as the taste sensor as long as the apparatus can convert each element of saltiness, sourness, bitterness, sweetness, umami, pungency, and astringency constituting the taste of food into data and output the data.

Meanwhile, as the aroma sensor, for example, a sensor in which micro electro mechanical systems (MEMS) elements are arranged in an array is used. The MEMS element is an element having adsorption characteristics for molecules of a variety of aroma substances. The aroma is measured by analyzing a change in the frequency of the MEMS elements when molecules of the aroma substance are adsorbed.

An aroma sensor using another approach such as a semiconductor technique in which a resistance value of a semiconductor is changed by adsorption of molecules of the aroma substance, a quartz oscillator technique in which a change in frequency due to a change in mass is detected, or a field effect transistor (FET) biosensor technique may be used. The FET biosensor technique is an approach of measuring a potential difference by causing molecules of the aroma substance to be adsorbed to a gate electrode. The technology disclosed in Japanese Patent Application Laid-Open No. 2019-124700 can also be applied to the aroma sensor of the measurement apparatus 351.

The sensor value output from the aroma sensor of the measurement apparatus 351 is acquired by a computer as aroma sensor data. For example, values for each element expressing aromas such as a hot aroma, a fruity aroma, a grassy smell, a musty smell (cheesy), a citrus aroma, and a rose aroma are acquired as the aroma sensor data.

The measurement of the molecular structure of the dish is analyzed by an approach such as gas chromatography (GC) or liquid chromatography (LC). An analysis result by the measurement apparatus 351 is acquired by a computer as the molecular structure information.

As indicated by the arrows A33 and A34 in FIG. 19, the measurement as described above is repeatedly performed. By repeating the measurement, the time-series data of the taste sensor data, the aroma sensor data, and the molecular structure information is acquired.

The data measured as described above is input to the learning apparatus 301 as learning data and used for learning of the inference models. Information in which a variety of combinations of types and amounts of the molecular structure and the control information (the taste control information and the aroma control information) for reproducing tastes and aromas caused by the molecular structure in a variety of states are associated is also input as learning data to the learning apparatus 301.

<Working of Learning Apparatus>

Figure 20:
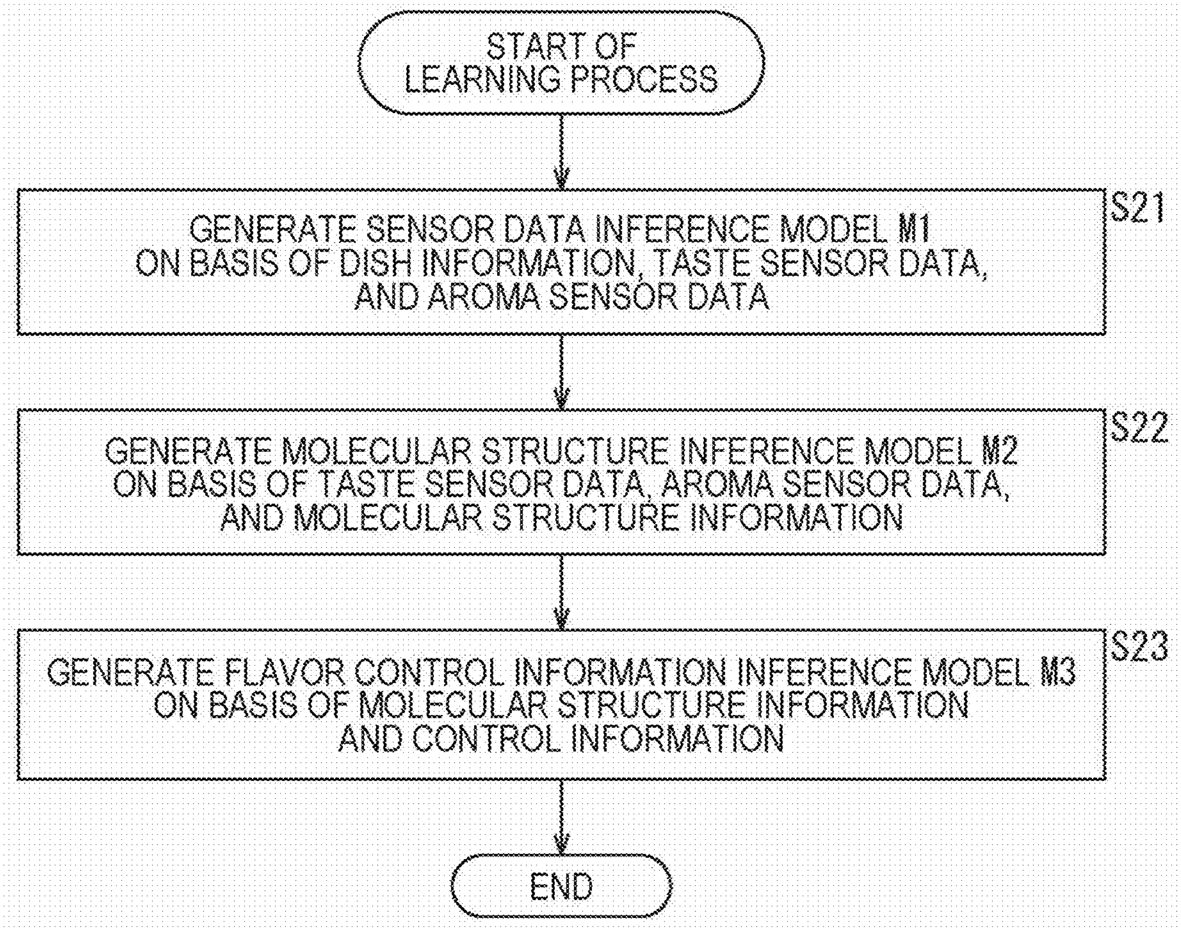
FIG. 20 is a flowchart explaining a learning process.

A learning process of the learning apparatus 301 will be described with reference to the flowchart in FIG. 20.

In step S21, the learning unit 313 performs machine learning using the dish information, the taste sensor data, and the aroma sensor data regarding a plurality of dishes and generates the sensor data inference model M1. For example, machine learning is performed on the basis of the dish information, and the taste sensor data and the aroma sensor data obtained by measurement with the dish completed by cooking in line with description in this dish information, as an object, and the sensor data inference model M1 is generated.

In step S22, the learning unit 313 performs machine learning using the taste sensor data, the aroma sensor data, and the molecular structure information and generates the molecular structure inference model M2.

In step S23, the learning unit 313 performs machine learning using the molecular structure information and the control information for reproducing tastes and aromas caused by the molecular structure in a variety of states and generates the flavor control information inference model M3.

The learning as described above is repeatedly performed while changing the type and amount of the ingredient, the value of the sensor data, the type and amount of the molecular structure, and the like, and inference models capable of handling a variety of types and amounts of ingredients and cooking methods are generated.

Although it is assumed that the three types of inference models of the sensor data inference model M1, the molecular structure inference model M2, and the flavor control information inference model M3 are prepared, one inference model whose input is information on ingredients and information on cooking methods and whose output is the control information may be prepared. In addition, the final control information may be inferred using four or more types of inference models.

<<Modifications>>

<Adjustment of Sensor Data>

The chef may be allowed to adjust the taste sensor data and the aroma sensor data inferred using the sensor data inference model M1.

Figure 21:
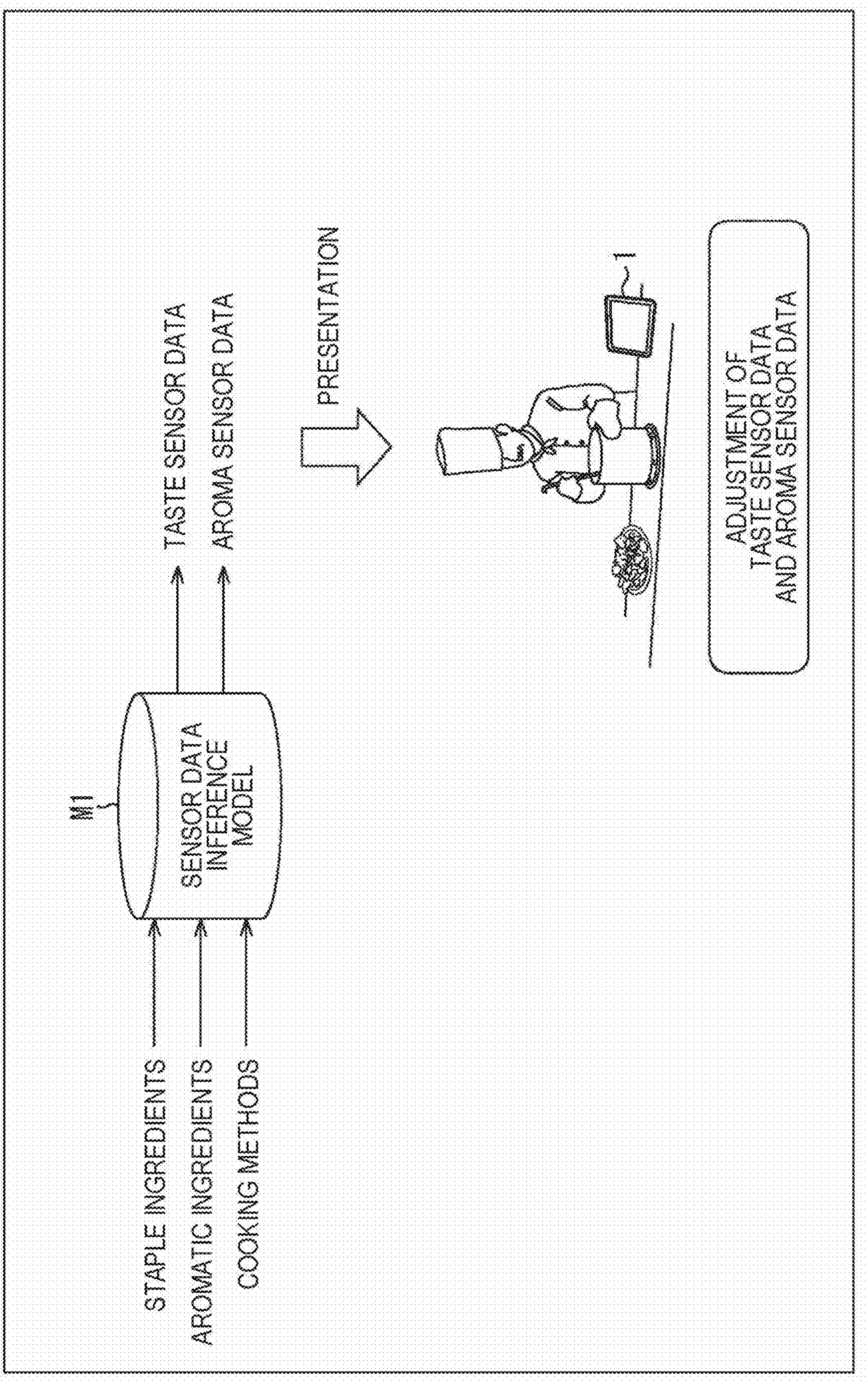
FIG. 21 is a diagram illustrating how taste sensor data and aroma sensor data are adjusted.

In these circumstances, as indicated by the outlined arrow in FIG. 21, the taste sensor data and the aroma sensor data acquired as an inference result based on the sensor data inference model M1 are presented to the chef when the chef selects the ingredients and the cooking methods. The taste sensor data and the aroma sensor data are presented using, for example, a screen of the information processing apparatus 1.

Figure 22:
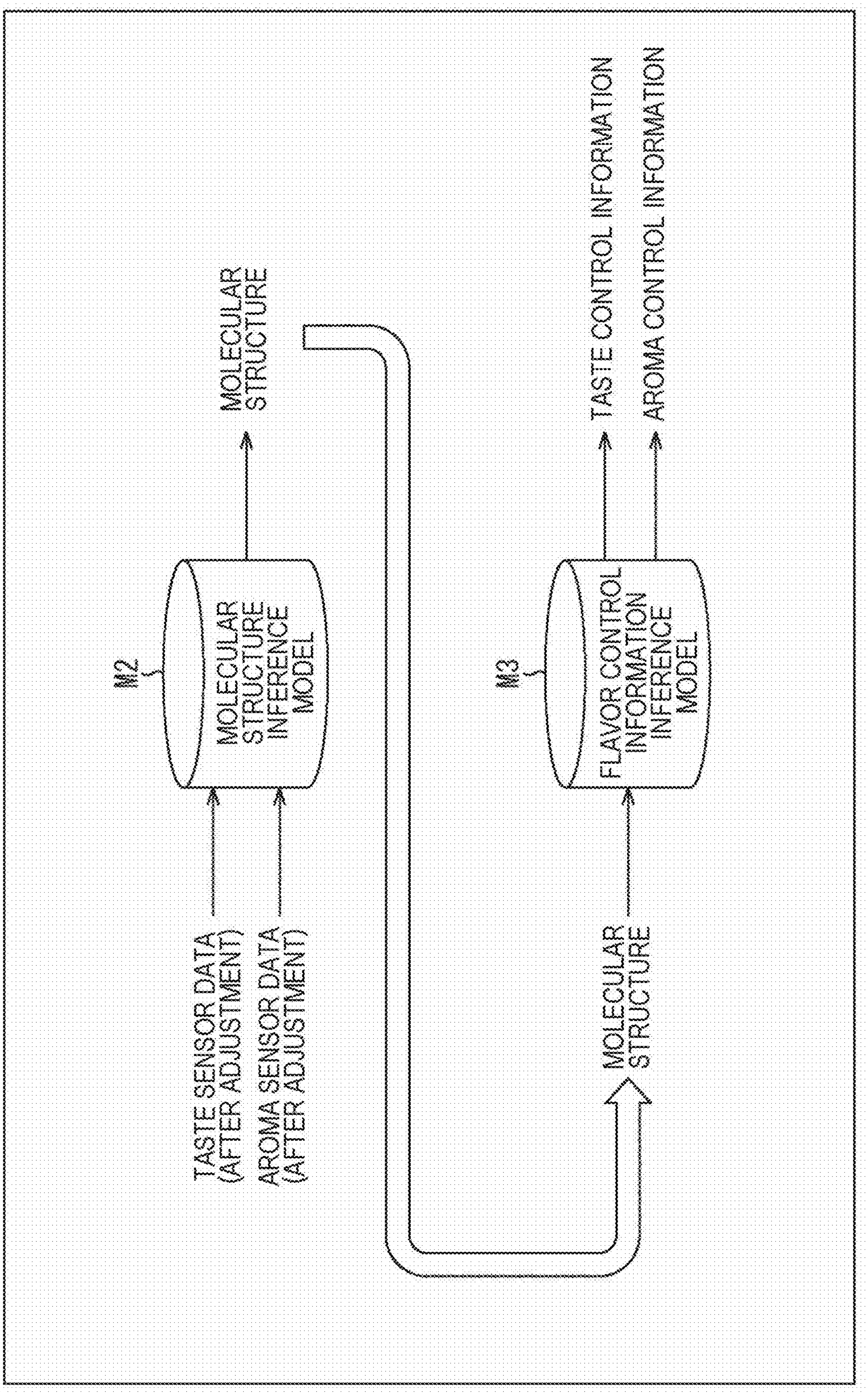
FIG. 22 is a diagram illustrating an example of inference using sensor data after adjustment.

The chef is allowed to check the taste represented by the taste sensor data and the aroma represented by the aroma sensor data and adjust the taste sensor data and the aroma sensor data, using the screen of the information processing apparatus 1. The taste sensor data and the aroma sensor data after adjustment are input to the molecular structure inference model M2, and the molecular structure information according to the taste sensor data and the aroma sensor data after adjustment is output, as illustrated in FIG. 22.

The molecular structure information output from the molecular structure inference model M2 is input to the flavor control information inference model M3, and the taste control information and the aroma control information are output. By controlling the flavor presentation device 2 on the basis of the taste control information and the aroma control information output from the flavor control information inference model M3, the flavor to be presented to the chef will have a flavor reflecting the contents adjusted by the chef.

Figure 23:
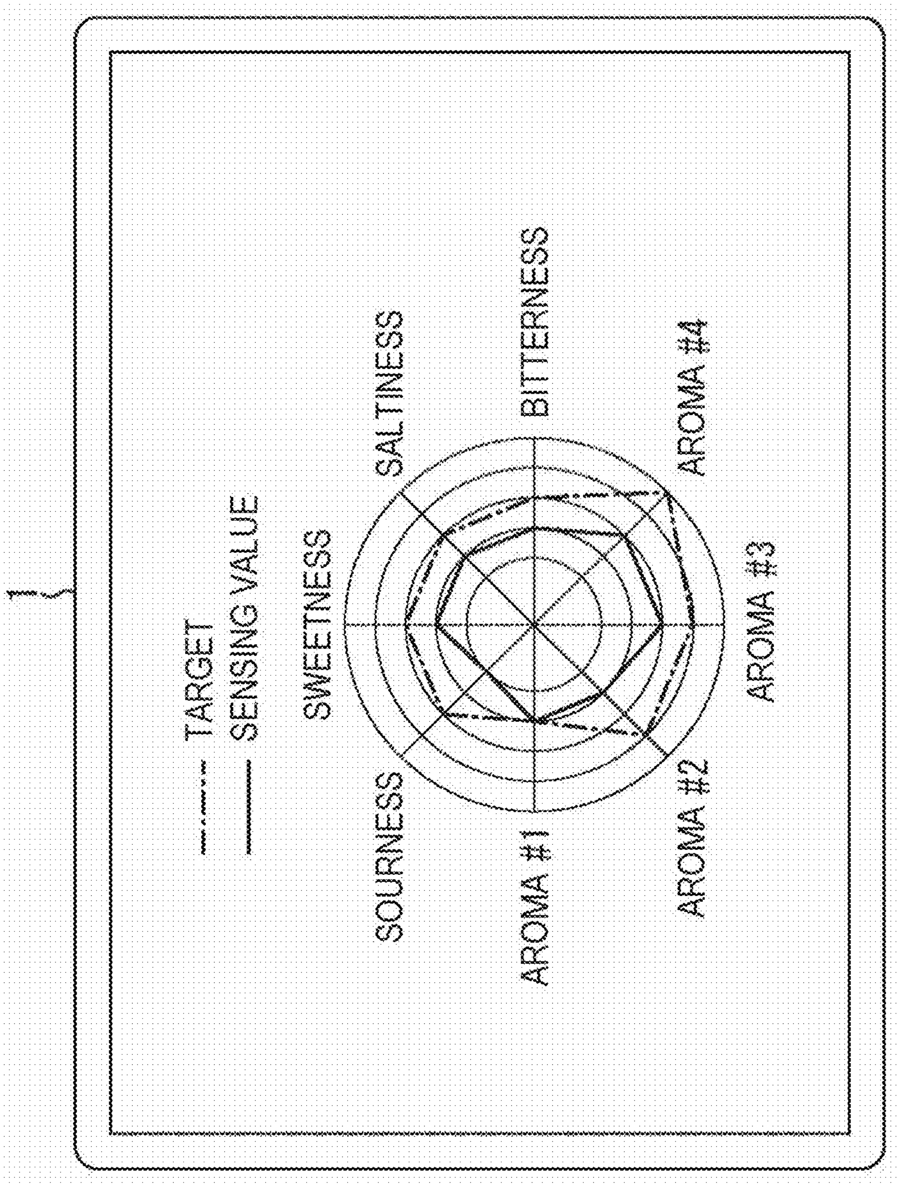
FIG. 23 is a diagram illustrating an example of a display screen for sensor data.

FIG. 23 is a diagram illustrating an example of a display screen for sensor data.

The taste sensor data and the aroma sensor data acquired as an inference result based on the sensor data inference model M1 are presented to the chef, using, for example, a radar chart as illustrated in FIG. 23.

The solid line on the radar chart illustrated in FIG. 23 represents values of respective elements of the taste and aroma. In the example in FIG. 23, the umami among the five basic tastes is omitted, but the value of the umami is also displayed as appropriate. Aromas #1 to #4 represent respective elements of the aromas such as a hot aroma, a fruity aroma, and a citrus aroma. The taste sensor data and the aroma sensor data may be presented using radar charts different from each other.

For example, the chef is allowed to check such sensor data and designate a target value of the sensor data on the radar chart. The values of the sensor data designated by the chef are displayed as indicated by the one-dot chain line, for example. In the example in FIG. 23, for example, the taste sensor data is adjusted such that each of the sourness, sweetness, saltiness, and bitterness is enhanced. In addition, the aroma sensor data is adjusted such that each of the aromas #2, #3, and #4 is enhanced while the aroma #1 is kept as it is.

The taste sensor data and aroma sensor data after adjustment that have been adjusted in this manner are used as input of the molecular structure inference model M2 as described above.

In this manner, it may be enabled to adjust the sensor data as well as, for example, to select the ingredients and the cooking methods and select the amount of the ingredients. Instead of adjusting the sensor data, the amount and type of the molecular structure may be allowed to be adjusted. In addition, the control information may be allowed to be adjusted.

Figure 24:
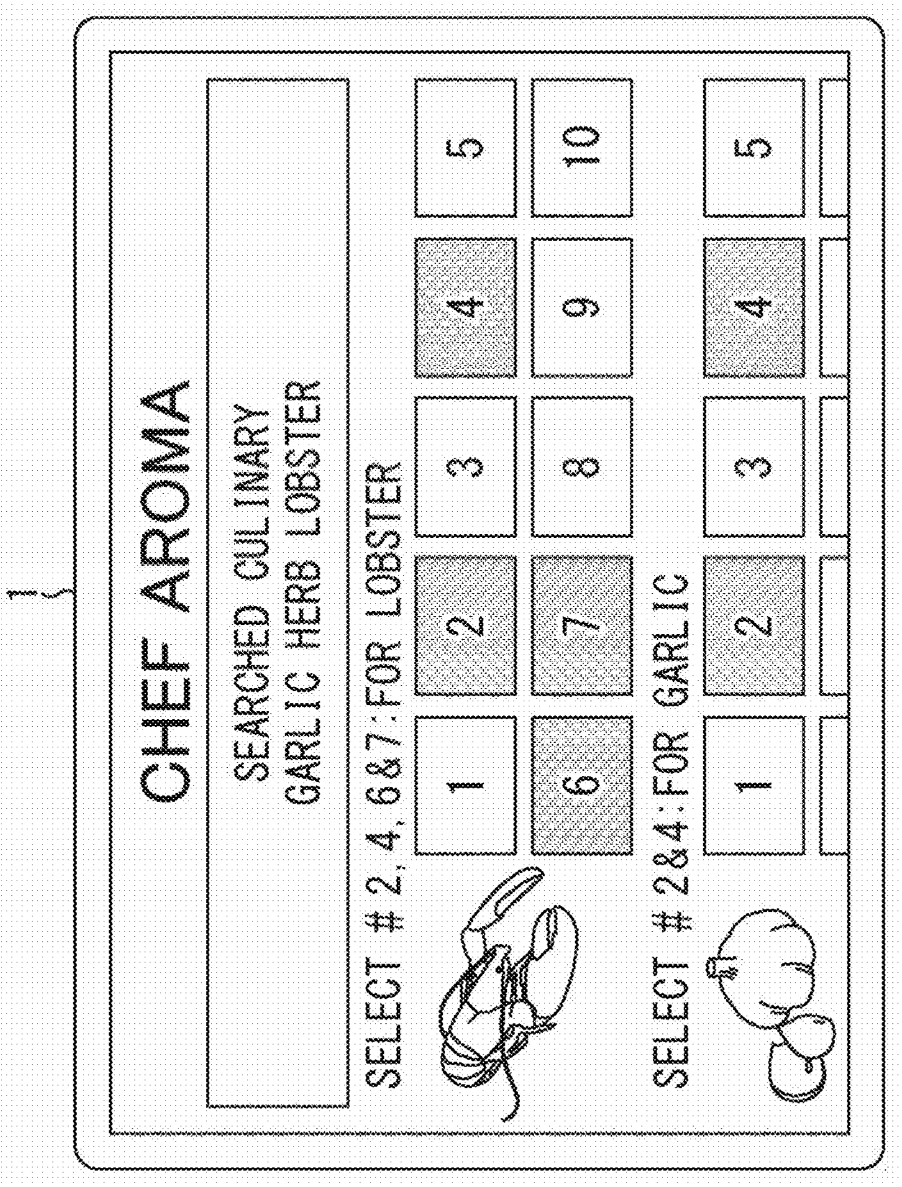
FIG. 24 is a diagram illustrating an example of a display screen for aromas of a simulation dish.

FIG. 24 is a diagram illustrating an example of a display screen for aromas of a simulation dish.

The screen illustrated in FIG. 24 is a diagram illustrating an aroma of the simulation dish that will be completed in a case where lobster is selected as a staple ingredient, garlic and herbs are also selected as aromatic ingredients, and grilling is selected as a cooking method.

The numbers in the rectangular images organized in a tile shape represent the aroma cartridges provided in the flavor presentation device 2. In the example in FIG. 24, the lobster aroma in the simulation dish will be expressed using second, fourth, sixth, and seventh aroma cartridges, and the garlic aroma in the simulation dish will be expressed using second and fourth aroma cartridges.

As the aroma control information for expressing the lobster aroma, information representing that the second, fourth, sixth, and seventh aroma cartridges are to be used to deliver the aroma is transferred to the flavor presentation device 2 from the information processing apparatus 1. In addition, as the aroma control information for expressing the garlic aroma, information representing that the second and fourth aroma cartridges are to be used to deliver the aroma is transferred to the flavor presentation device 2 from the information processing apparatus 1.

The chef who has checked the contents of such control information on the aroma may be allowed to designate an aroma cartridge to be used, on the screen, such as adding another aroma cartridge or deleting a selected aroma cartridge.

In this manner, the screen in FIG. 24 is used to check and adjust the contents of the control information about the aroma of the simulation dish. As for the taste of the simulation dish, the contents of the taste control information are similarly presented to the chef and used for adjustment.

Detailed information such as the amount (strength) of the aroma to be delivered using each aroma cartridge and the timing of delivery may be displayed on the screen in FIG. 24. In these circumstances, the chef may be allowed to, for example, adjust the amount of the aroma or adjust the timing of delivery.

<Example of Remote Control>

The flavor presentation device 2 has been assumed to be controlled by the information processing apparatus 1 prepared near the flavor presentation device 2, but may be controlled remotely.

Figure 25:
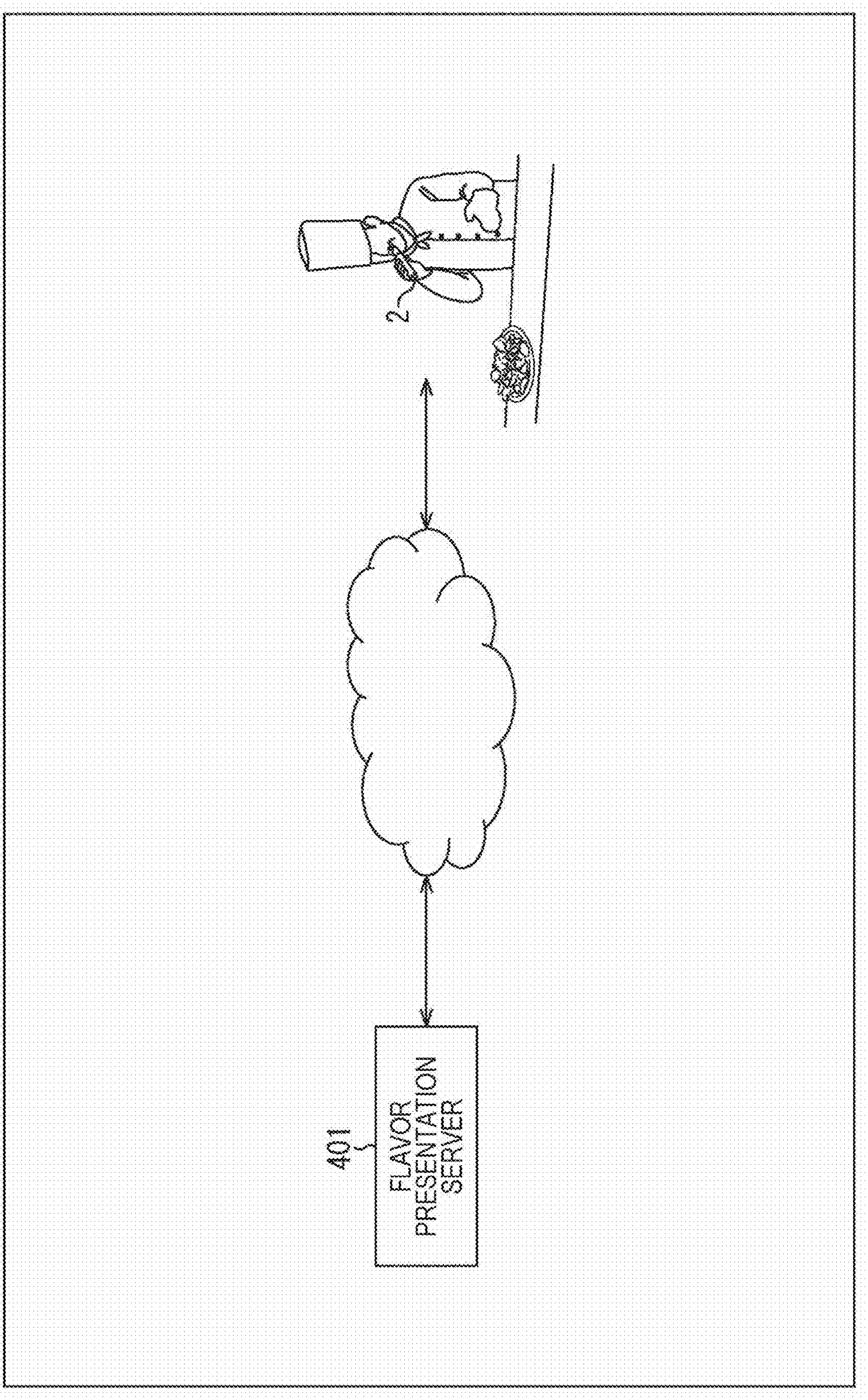
FIG. 25 is a diagram illustrating a configuration example of a network system.

FIG. 25 is a diagram illustrating a configuration example of a network system.

In the network system in FIG. 25, the flavor presentation device 2 is controlled by a flavor presentation server 401 that is a server on a network such as the Internet. The flavor presentation server 401 is provided with, for example, the same configuration as the configuration of the information processing unit 151 illustrated in FIG. 8. The flavor presentation server 401 functions as an information processing apparatus that remotely controls presentation of a flavor.

Communication is performed between the flavor presentation server 401 and the flavor presentation device 2 provided on the chef side, via the Internet. The information processing apparatus 1 is also connected to the Internet. Information representing the ingredients, the cooking methods, and the like selected by the chef is transferred to the flavor presentation server 401 from the information processing apparatus 1.

The flavor presentation server 401 acquires the contents selected by the chef regarding the ingredients and the cooking methods and infers the control information for presenting the flavor of the simulation dish. In addition, the flavor presentation server 401 transfers the taste control information and the aroma control information to the flavor presentation device 2 and drives the flavor presentation device 2.

In this manner, various processes including inference using the inference models and control of the flavor presentation device 2 can be performed by the flavor presentation server 401.

Figure 26:
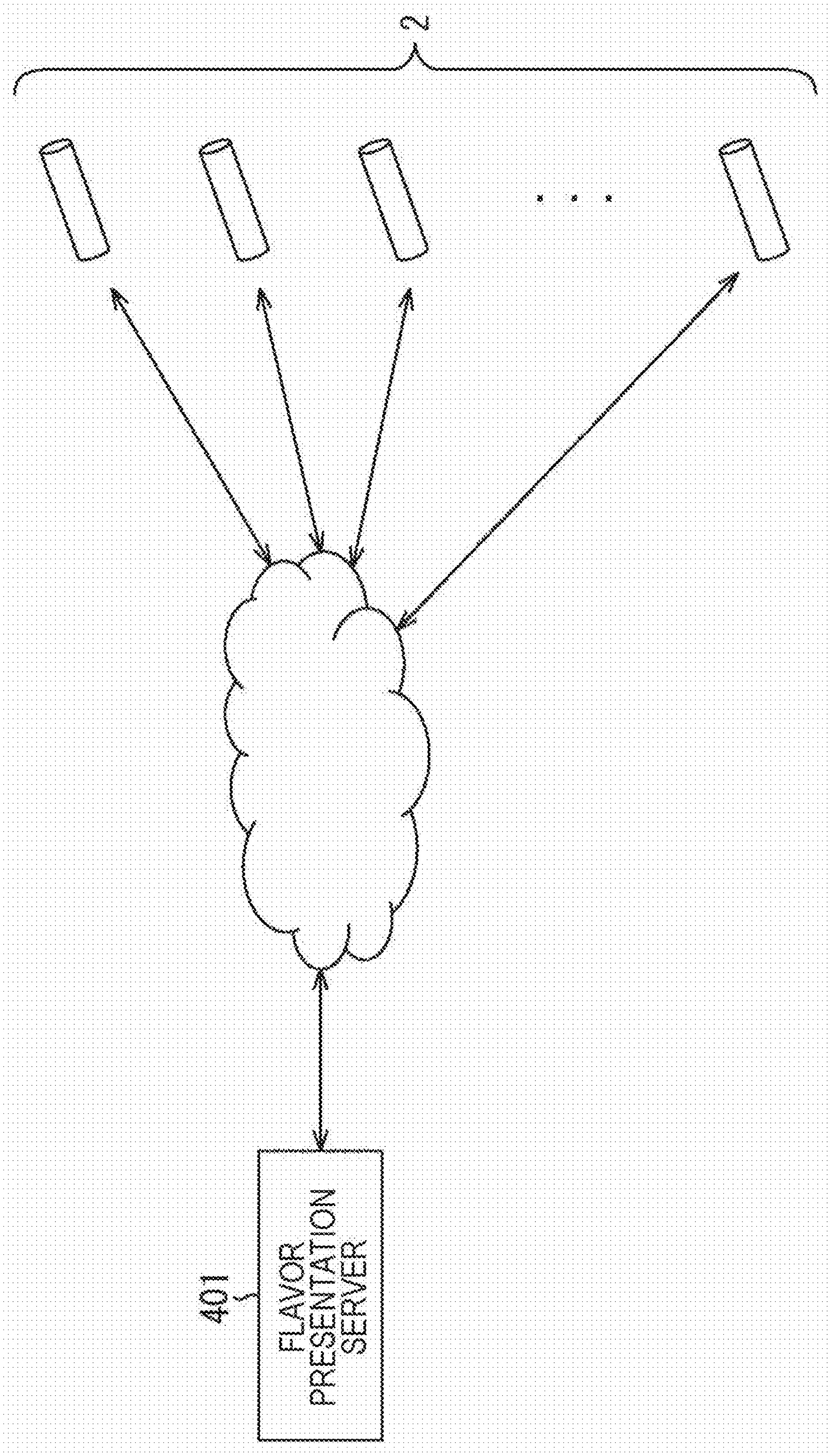
FIG. 26 is a diagram illustrating another configuration example of the network system.

FIG. 26 is a diagram illustrating another configuration example of the network system.

In the example in FIG. 26, a plurality of flavor presentation devices 2 is connected to the flavor presentation server 401 via the Internet. The flavor presentation devices 2 are devices used by users different from each other.

Using such a network system, the same flavor may be simultaneously presented to a plurality of users. Each of the plurality of users can simultaneously experience the flavor of the simulation dish.

<Others>

Although the flavor that changes with the passage of time has been assumed to be presented on the basis of the time-series control information, a flavor at a certain timing may be presented without changing the flavor.

Although the flavor presented by the flavor presentation device 2 has been assumed to be configured by the taste and the aroma, the flavor may include a texture, and the texture such as temperature may be presented together with the taste and the aroma. In these circumstances, the control information for controlling the texture is transferred to the flavor presentation device 2, and the texture of the simulation dish is presented to the user. This enables to provide an experience closer to the state in which the actual dish is eaten.

The taste may be presented by the flavor presentation device 2 while shifting a position where a stimulus is given. For example, the taste is presented while the position where a stimulus is given is shifted from the center of the tongue toward the back. This enables to reproduce the way of sensing the taste closer to the state in which the actual dish is eaten.

Figure 27:
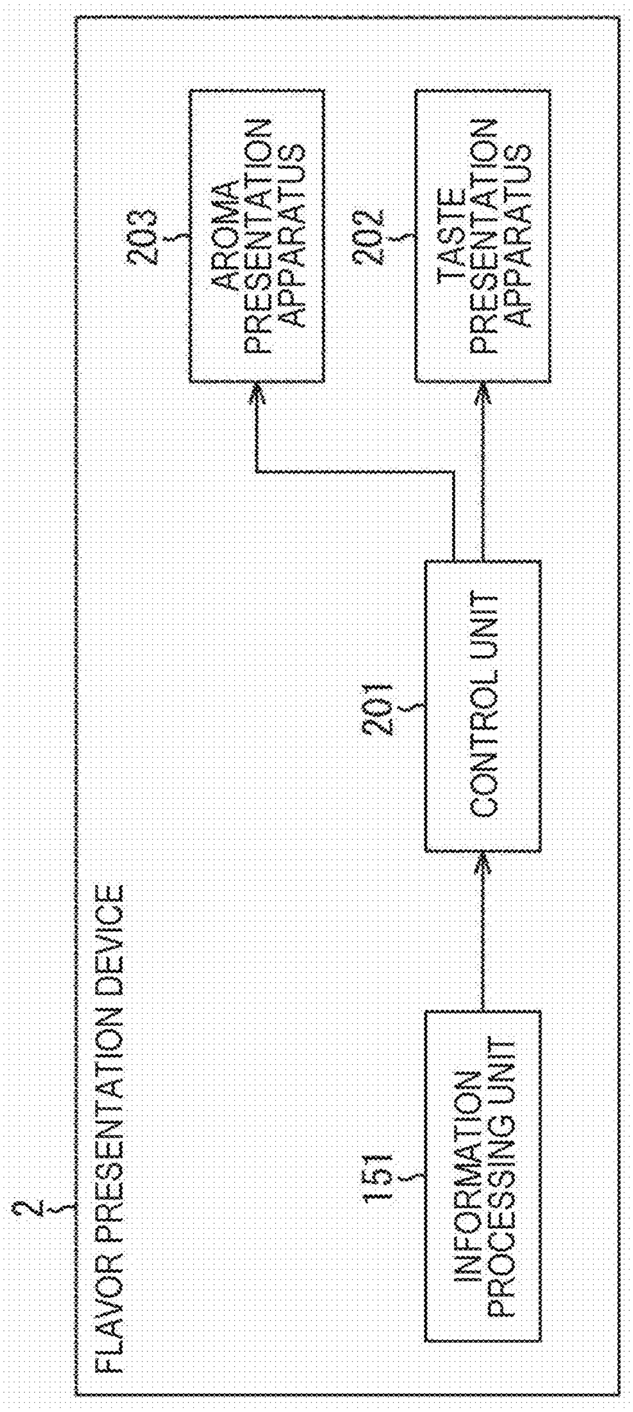
FIG. 27 is a block diagram illustrating another configuration example of the flavor presentation device.

FIG. 27 is a block diagram illustrating another configuration example of the flavor presentation device 2.

The configuration of the flavor presentation device 2 illustrated in FIG. 27 is different from the configuration in FIG. 11 in that the information processing unit 151 is provided inside the flavor presentation device 2. In the flavor presentation device 2 having the configuration illustrated in FIG. 27, inference of the control information and the like are performed by the flavor presentation device 2 by itself.

The presentation of the flavor by the flavor presentation device 2 can be autonomously performed by the flavor presentation device 2 instead of being performed under the control of an external apparatus.

<About Program>

The series of processes described above can be executed by hardware and also can be executed by software. In a case where the series of processes is executed by software, a program constituting the software is installed, from a program recording medium, to a computer incorporated in dedicated hardware, a general-purpose personal computer, or the like.

The program to be installed is provided by being recorded in the removable medium 111 illustrated in FIG. 7, including an optical disc (compact disc-read only memory (CD-ROM), a digital versatile disc (DVD), and the like), a semiconductor memory, or the like. In addition, the program may be provided via a wired or wireless transmission medium such as a local area network, the Internet, or digital broadcasting. The program can be installed in advance in the ROM 102 or the storage unit 108.

The program executed by the computer may be a program in which the processes are performed in time series in the order described in the present description, or may be a program in which the processes are performed in parallel or at a necessary timing such as when a call is made.

In the present description, a system is intended to mean assembly of a plurality of constituent elements (apparatuses, modules (parts), and the like), and it does not matter whether or not all the constituent elements are located in the same housing. Therefore, a plurality of apparatuses accommodated in separate housings and connected via a network and one apparatus in which a plurality of modules is accommodated in one housing are both systems.

The effects described in the present description are merely examples and are not restrictive, and additionally, other effects may be provided.

The embodiments of the present technology are not restricted to the embodiments described above, and diverse alterations can be made without departing from the scope of the present technology.

For example, the present technology may be configured as cloud computing in which one function is shared by a plurality of apparatuses via the network and processed together.

In addition, each of the steps in the flowcharts described above can be executed by one apparatus and also can be executed by a plurality of apparatuses in a shared manner.

Furthermore, in a case where a plurality of processes is included in one step, the plurality of processes included in one step can be executed by one apparatus and also can be executed in a shared manner by a plurality of apparatuses.

<Examples of Configuration Combinations>

The present technology can also be configured as follows.

(1)

An information processing apparatus including a presentation control unit that controls a presentation apparatus including a first delivery unit that delivers an aroma of a dish toward a nose and a second delivery unit that delivers the aroma of the dish toward a throat, and presents the aroma of the dish to a user, using the aroma through the nose and the aroma through the throat.

(2)

The information processing apparatus according to (1) above, further including an acquisition unit that acquires contents selected by the user regarding an ingredient and a cooking method using the ingredient, in which the presentation control unit presents the aroma of the dish obtained by cooking the ingredient by the cooking method.

(3)

The information processing apparatus according to (1) or (2) above, in which the presentation control unit changes the aroma of the dish with a passage of time.

(4) The information processing apparatus according to (3) above, in which the presentation control unit changes at least one of a type and strength of the aroma of the dish.

(5)

The information processing apparatus according to (3) or (4) above, in which the presentation control unit controls each of a timing at which the first delivery unit is caused to deliver the aroma of the dish and a timing at which the second delivery unit is caused to deliver the aroma of the dish.

(6)

The information processing apparatus according to (5) above, in which the presentation control unit causes the first delivery unit to deliver the aroma of the dish and then causes the second delivery unit to deliver the aroma of the dish.

(7)

The information processing apparatus according to any one of (2) to (6) above, in which the presentation apparatus further includes a taste presentation unit that presents a taste of the dish, and the presentation control unit presents the taste of the dish to the user together with the aroma of the dish.

(8)

The information processing apparatus according to (7) above, in which the presentation control unit changes the taste of the dish with a passage of time.

(9)

The information processing apparatus according to (8) above, in which the presentation control unit changes at least one of a type and strength of the taste of the dish.

(10)

The information processing apparatus according to any one of (7) to (9) above, further including an inference unit that infers the aroma and the taste of the dish obtained by cooking the ingredient by the cooking method.

(11)

The information processing apparatus according to (10) above, in which the inference unit uses a first inference model whose input is information on the ingredient and information on the cooking method and whose output is a measurement value of the aroma and a measurement value of the taste of the dish obtained by cooking the ingredient by the cooking method, to perform inference of the measurement value of the aroma and the measurement value of the taste of the dish.

(12)

The information processing apparatus according to (11) above, in which the inference unit uses a second inference model whose input is the measurement value of the aroma and the measurement value of the taste of the dish and whose output is a type and an amount of a molecular structure of the dish obtained by cooking the ingredient by the cooking method, to infer the type and the amount of the molecular structure of the dish.

(13)

The information processing apparatus according to (12) above, in which the inference unit uses a third inference model whose input is the type and the amount of the molecular structure of the dish and whose output is a control content relating to presentation of the aroma and a control content relating to presentation of the taste of the dish, to infer the control contents for the presentation apparatus.

(14)

A control method including:

controlling a presentation apparatus including a first delivery unit that delivers an aroma of a dish toward a nose and a second delivery unit that delivers the aroma of the dish toward a throat; and presenting the aroma of the dish to a user, using the aroma through the nose and the aroma through the throat, by an information processing apparatus.

(15)

A program for causing a computer to execute a process including:

controlling a presentation apparatus including a first delivery unit that delivers an aroma of a dish toward a nose and a second delivery unit that delivers the aroma of the dish toward a throat; and presenting the aroma of the dish to a user, using the aroma through the nose and the aroma through the throat.

(16)

A presentation apparatus including:

an aroma creation unit that creates an aroma of a dish;

a first delivery unit that delivers the aroma of the dish toward a nose of a user; and a second delivery unit that delivers the aroma of the dish toward a throat of the user.

(17)

The presentation apparatus according to (16) above, in which the aroma creation unit changes the aroma of the dish with a passage of time.

(18) The presentation apparatus according to (16) or (17) above, further including a taste presentation unit that presents a taste of the dish.

(19)

The presentation apparatus according to (18) above, in which the taste presentation unit changes the taste of the dish with a passage of time.

REFERENCE SIGNS LIST

1 Information processing apparatus
2 Flavor presentation device
21 Taste presentation unit
31, 32 Aroma delivery nozzle
151 Information processing unit
161 Selected content acquisition unit
162 Inference unit
163 Presentation control unit
201 Control unit
202 Taste presentation apparatus
203 Aroma presentation apparatus
211 Controller
212 Gel reservoir unit
221 Controller
222 Aroma creation unit
223 Delivery adjustment unit
301 Learning apparatus
311 Learning data acquisition unit
312 Learning data DB
313 Learning unit
314 Inference model storage unit
351 Measurement apparatus
401 Flavor presentation server

What is claimed is:

1. An information processing apparatus comprising:

circuitry including a processor that is configured to acquire information regarding an ingredient and a cooking method for making a dish using the ingredient, the ingredient and the cooking method being selected by a user:

infer an aroma and a taste of the dish to be made by using a first inference model and a second inference model, the first inference model being configured to receive the information regarding the ingredient and the cooking method and to output measurement values of the aroma and the taste of the dish, and the second inference model being configured to receive the measurement values of the aroma and the taste of the dish and to output a type and an amount of a molecular structure of the dish; and control a presentation apparatus including a first aroma delivery unit configured to deliver the aroma of the dish toward a nose of the user and a second aroma delivery unit configured to deliver the aroma of the dish toward a throat of the user, to present the aroma of the dish to the user, through the nose and through the throat, wherein the presentation apparatus further includes a taste presentation unit configured to deliver the taste of the dish to the user, and the circuitry is further configured to control the presentation apparatus to present the taste of the dish to the user together with the aroma of the dish.

2. The information processing apparatus according to claim 1, wherein the circuitry is further configured to change the aroma of the dish with a passage of time.

3. The information processing apparatus according to claim 2, wherein the circuitry is further configured to change at least one of a type and strength of the aroma of the dish.

4. The information processing apparatus according to claim 2, wherein the circuitry is further configured to control each of a timing at which the first aroma delivery unit is caused to deliver the aroma of the dish and a timing at which the second aroma delivery unit is caused to deliver the aroma of the dish.

5. The information processing apparatus according to claim 4, wherein the circuitry is further configured to cause the first aroma delivery unit to deliver the aroma of the dish and then cause the second aroma delivery unit to deliver the aroma of the dish after the first aroma delivery unit is caused to deliver the aroma of the dish.

6. The information processing apparatus according to claim 1, wherein the circuitry is further configured to cause the taste presentation unit to change the taste of the dish with a passage of time.

7. The information processing apparatus according to claim 6, wherein the circuitry is further configured to change at least one of a type and strength of the taste of the dish.

8. The information processing apparatus according to claim 1, wherein the circuitry is further configured to infer the aroma and the taste of the dish, by using a third inference model is that is configured to receive the type and the amount of the molecular structure of the dish and output control information relating to presentation of the aroma and the taste of the dish, and to control the presentation apparatus.

9. A control method executed by an information processing apparatus, the method comprising:

acquiring information regarding an ingredient and a cooking method for making a dish using the ingredient, the ingredient and the cooking method being selected by a user;

inferring an aroma and a taste of the dish to be made by using a first inference model and a second inference model, the first inference model being configured to receive the information regarding the ingredient and the cooking method and to output measurement values of the aroma and the taste of the dish, and the second inference model being configured to receive the measurement values of the aroma and the taste of the dish and to output a type and an amount of a molecular structure of the dish; and controlling a presentation apparatus including a first aroma delivery unit configured to deliver the aroma of the dish toward a nose of the user and a second aroma delivery unit configured to deliver the aroma of the dish toward a throat of the user; and presenting the aroma of the dish to the user, through the nose and through the throat, wherein the presentation apparatus further includes a taste presentation unit configured to deliver the taste of the dish to the user, and the method further comprises controlling the presentation apparatus to present the taste of the dish to the user together with the aroma of the dish.

10. A non-transitory computer-readable storage medium storing a program for causing a computer to execute a process comprising:

acquiring information regarding an ingredient and a cooking method for making a dish using the ingredient, the ingredient and the cooking method being selected by a user:

inferring an aroma and a taste of the dish to be made by using a first inference model and a second inference model, the first inference model being configured to receive the information regarding the ingredient and the cooking method and to output measurement values of the aroma and the taste of the dish, and the second inference model being configured to receive the measurement values of the aroma and the taste of the dish and to output a type and an amount of a molecular structure of the dish; and controlling a presentation apparatus including first aroma delivery unit configured to deliver an aroma of a the dish toward a nose of the user and a second aroma delivery unit configured to deliver the aroma of the dish toward a throat of the user; and presenting the aroma of the dish to the user, through the nose and through the throat, wherein the presentation apparatus further includes a taste presentation unit configured to deliver the taste of the dish to the user, and the processing further comprises controlling the presentation apparatus to present the taste of the dish to the user together with the aroma of the dish.

11. A presentation apparatus comprising:

circuitry including a processor that is configured to infer an aroma and a taste of a dish obtained by cooking an ingredient by a cooking method, and control the presentation apparatus based on the aroma and the taste of the dish that were inferred;

an aroma creation unit that creates an aroma of the dish;

a first delivery unit that delivers the aroma of the dish toward a nose of a user; and a second delivery unit that delivers the aroma of the dish toward a throat of the user, wherein the circuitry is further configured to control each of the aroma creation unit, the first delivery unit, and the second delivery unit to present the aroma of the dish to the user using the aroma through the nose and the aroma through the throat.

12. The presentation apparatus according to claim 11, wherein the circuitry is further configured to cause the aroma creation unit to change the aroma of the dish with a passage of time.

13. The presentation apparatus according to claim 11, further comprising:

a taste presentation unit configured to present a taste of the dish.

14. The presentation apparatus according to claim 13, wherein the circuitry is further configured to cause the taste presentation unit to change the taste of the dish with a passage of time.

* * * * *